US007921817B2

(12) United States Patent
Cleeves

(10) Patent No.: US 7,921,817 B2
(45) Date of Patent: Apr. 12, 2011

(54) INTERNAL COMBUSTION ENGINE

(75) Inventor: James M. Cleeves, Redwood City, CA (US)

(73) Assignee: Cleeves Engines Inc., San Carlos, CA (US)

( * ) Notice: Subject to any disclaimer, the term of this patent is extended or adjusted under 35 U.S.C. 154(b) by 0 days.

(21) Appl. No.: 12/478,629

(22) Filed: Jun. 4, 2009

(65) Prior Publication Data

US 2009/0266339 A1    Oct. 29, 2009

Related U.S. Application Data

(63) Continuation of application No. 11/695,536, filed on Apr. 2, 2007, now Pat. No. 7,559,298.

(60) Provisional application No. 60/792,995, filed on Apr. 18, 2006, provisional application No. 60/853,095, filed on Oct. 20, 2006.

(51) Int. Cl.
*F02B 75/18* (2006.01)
*F01L 7/02* (2006.01)

(52) U.S. Cl. .................. 123/52.6; 123/81 C; 123/188.5

(58) Field of Classification Search .... 123/51 R–51 BD, 123/52.2–52.6, 53.2, 59.6, 59.3, 42, 80 C, 123/81 C, 188.5, 190.12, 190.13, 196 V
See application file for complete search history.

(56) References Cited

U.S. PATENT DOCUMENTS

| 367,496 | A | | 8/1887 | Atkinson | |
|---|---|---|---|---|---|
| 1,082,004 | A | | 12/1913 | Anthony | |
| 1,316,977 | A | | 9/1919 | Ricardo | |
| 1,377,798 | A | | 5/1921 | Berckenhoff | |
| 1,472,549 | A | * | 10/1923 | Burtnett | 123/71 VA |
| 1,497,206 | A | | 6/1924 | Booton | |
| 1,502,291 | A | * | 7/1924 | Conway | 123/65 VA |
| 1,819,897 | A | | 8/1931 | Johnson | |
| 1,823,770 | A | * | 9/1931 | Tartrais | 123/80 C |
| 1,856,242 | A | | 5/1932 | D'Aix | |
| 1,889,946 | A | | 12/1932 | Cadwell | |
| 2,121,409 | A | * | 6/1938 | Ricardo | 123/81 C |
| 2,292,233 | A | | 3/1940 | Lysholm | |
| 2,199,625 | A | | 5/1940 | Fiala-Fernbrugg | |
| 2,686,507 | A | | 8/1954 | Lombardi | |
| 2,773,490 | A | | 12/1956 | Miller | |

(Continued)

FOREIGN PATENT DOCUMENTS

JP         56106040 A    8/1981

(Continued)

OTHER PUBLICATIONS

U.S. Appl. No. 12/624,276, filed Nov. 23, 2009.

(Continued)

*Primary Examiner* — Noah Kamen
(74) *Attorney, Agent, or Firm* — Mintz, Levin, Cohn, Ferris, Glovsky and Popeo, P.C.

(57) ABSTRACT

An internal combustion engine is provided. Facing pistons eliminate a cylinder head, thereby reducing heat losses through a cylinder head. Facing pistons also halve the stroke that would be required for one piston to provide the same compression ratio, and the engine can thus be run at higher revolutions per minute and produce more power. An internal sleeve valve is provided for space and other considerations. A combustion chamber size-varying mechanism allows for adjustment of the minimum size of an internal volume to increase efficiency at partial-power operation. Variable intake valve operation is used to control engine power.

24 Claims, 16 Drawing Sheets

U.S. PATENT DOCUMENTS

| | | | |
|---|---|---|---|
| 2,817,322 | A | 12/1957 | Miller |
| 2,858,816 | A | 11/1958 | Prentice |
| 2,937,631 | A | 5/1960 | Coyle |
| 3,485,221 | A | 12/1969 | Feedback |
| 3,533,429 | A | 10/1970 | Shoulders |
| 3,780,719 | A | 12/1973 | Weiertz |
| 3,948,241 | A | 4/1976 | Melchior |
| 4,057,040 | A | 11/1977 | Wax |
| 4,104,995 | A | 8/1978 | Steinbock |
| 4,516,537 | A | 5/1985 | Nakahara |
| 4,535,735 | A | 8/1985 | Yoshinaga |
| 4,856,463 | A | 8/1989 | Johnston |
| 5,025,757 | A | 6/1991 | Larsen |
| 5,058,536 | A | 10/1991 | Johnston |
| 5,127,375 | A | 7/1992 | Bowman |
| 5,188,067 | A | 2/1993 | Fontichiaro |
| 5,255,637 | A | 10/1993 | Schechter |
| 5,445,117 | A | 8/1995 | Mendler |
| 5,507,253 | A | 4/1996 | Lowi, Jr. |
| 5,560,326 | A | 10/1996 | Merritt |
| 5,803,042 | A | 9/1998 | Bortone |
| 6,039,011 | A | 3/2000 | Agalarov |
| 6,125,801 | A | 10/2000 | Mendler |
| 6,230,683 | B1 | 5/2001 | Zur Loye |
| 6,390,041 | B2 | 5/2002 | Nakamura |
| 6,474,281 | B1 | 11/2002 | Walters |
| 6,502,543 | B1 | 1/2003 | Arai |

FOREIGN PATENT DOCUMENTS

| | | |
|---|---|---|
| WO | 2007057660 A1 | 5/2007 |

OTHER PUBLICATIONS

Rennie, Gabriele, Engine Shows Diesel Efficiency without the Emissions, Homogeneous Charge Compression Ignition Engine—Lawrence Livermore National Laboratory, S&TR Apr. 2004, pp. 17-19.

Law, Don et al., Controlled Combustion in an IC-Engine with Fully Variable Valve Train, Homogeneous Charge Compression Ignition (HCCI) Combustion—SP 1623, Mar. 2001, pp. 17-18, Society of Automotive Engineers, Inc., Warrendale, PA, USA.

Oakley, Aaron et al., Experimental Studies on Controlled Auto-Ignition (CAI) Combustion of Gasoline in a 4-stroke Engine, Homogeneous Charge Compression Ignition (HCCI) Combustion—SP 1623, Mar. 2001, pp. 105-109, Society of Automotive Engineers, Inc. Warrendale, PA, USA.

Heywood, John B., Internal Combustion engine Fundamentals, Chapter 1—Engine Types and their Operation, Apr. 1988, p. 37, McGraw-Hill, Inc.

Heywood, John B., Internal Combustion Engine Fundamentals, Chapter 5—Ideal Models of Engine Cycles, Apr. 1988, pp. 170, 175, 184, and 185, McGraw-Hill, Inc.

Heywood, John B., Internal Combustion Engine Fundamentals, Chapter 9—Combustion in Spark-Ignition Engines, Apr. 1988, p. 393, McGraw-Hill, Inc.

Heywood, John B., Internal Combustion Engine Fundamentals, Chapter 12—Engine Heat Transfer, Apr. 1988, pp. A and B, McGraw-Hill, Inc.

Heywood, John B., Internal Combustion Engine Fundamentals, Chapter 13—Engine Friction and Lubrication, Apr. 1988, p. C, McGraw-Hill, Inc.

* cited by examiner

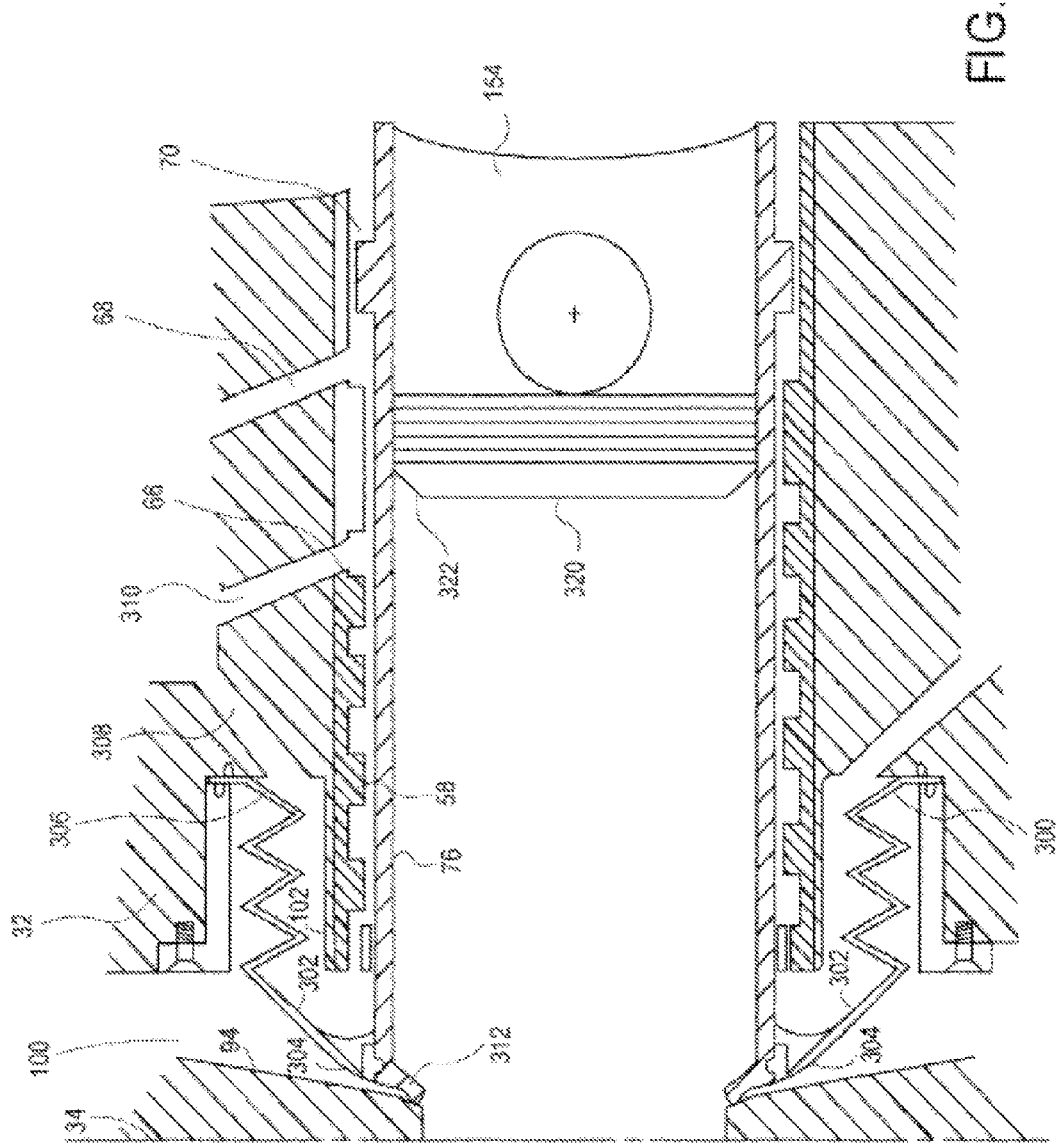

INTERNAL COMBUSTION ENGINE

CROSS REFERENCE TO RELATED APPLICATION

This application is a continuation of co-pending, commonly assigned U.S. patent application Ser. No. 11/695,536 filed on Apr. 2, 2007; which claims priority from U.S. Provisional Patent Application No. 60/792,995, filed on Apr. 18, 2006 and U.S. Provisional Patent Application No. 60/853,095 filed on Oct. 20, 2006, all of which are incorporated herein by reference.

BACKGROUND OF THE INVENTION

1. Field of the Invention

This invention relates to an internal combustion engine.

2. Discussion of Related Art

Internal combustion engines are used to power vehicles and other machinery. A typical reciprocating internal combustion engine includes a body, a piston, at least one port, at least one valve, a crankshaft (which serves as a drive shaft), and a connecting rod. The body defines a cylinder. The piston is located inside the cylinder so that a surface of the piston and a wall of the cylinder define an internal volume. The port is located in the body, and allows air and fuel into and exhaust gas out of the internal volume. The valve is movable between a first position wherein the port is open, and a second position wherein the valve closes the port. The crankshaft has a bearing section rotatably mounted to the body and an offset throw section. A connecting rod is connected between the piston and the offset throw section of the crankshaft, such that reciprocating movement of the piston causes rotation of the offset throw section of the crankshaft about a crankshaft axis.

A reciprocating engine of the above kind typically has a cylinder head that defines the internal volume together with the surface of the piston and the wall of the cylinder. Heat is transferred to the cylinder head and conducts through the cylinder head, thereby resulting in energy losses from the internal volume and a reduction in efficiency. One way of increasing efficiency is by reducing an area of the surface of the piston and increasing a stroke (a diameter of a circle that the offset throw section follows) of the piston. A large stroke results in high forces created on the piston and other components of the engine, so that the engine can only be run at lower revolutions per minute with a corresponding reduction in power. Partial-power operation in a conventional combustion engine is also less efficient than full-power operation because a gas within the internal volume does not expand and cool down fully during partial-power operation, resulting in a relatively high temperature of the gas when it is exhausted. The heat in the exhaust gas is an energy loss that results in a reduction in efficiency.

SUMMARY OF THE INVENTION

The invention provides an internal combustion engine, including a body defining first and second cylinders in communication with one another, first and second pistons in the first and second cylinders respectively, surfaces of the pistons and walls of the cylinders defining an internal volume, at least one port in the body to allow air and fuel into and exhaust gas out of the internal volume, first and second drive shafts, each having a bearing section mounted for rotation on a respective drive shaft axis through the body and each having an offset throw section, the first piston and offset throw section of the first drive shaft being connected and the second piston and the offset throw section of the second drive shaft being connected, such that reciprocating movement of the first and second pistons increases and decreases a size of the internal volume between minimum and maximum sizes and causes rotation of the offset throw sections of the first and second drive shafts about the drive shaft axes, the minimum size of the internal volume being adjustable between a large size for a large power delivery and a small size for a small power delivery, and at least one valve mounted to the body to respectively open and close the port and respectively allow and restrict flow of at least the air into the internal volume, the valve being operable to allow an increased amount of air into the internal volume during the large power delivery and a decreased amount of air during the small power delivery for one cycle of the pistons.

The internal combustion engine may further comprise a combustion chamber size-varying mechanism that adjusts a position of the bearing section of the second drive shaft relative to the body.

The combustion chamber size-varying mechanism may synchronize rotation of the drive shafts relative to one another.

The combustion chamber size-varying mechanism may include a gear train of first second, third, and fourth gears, the first and fourth gears being mounted to the first and second drive shafts, respectively, so that the first and fourth gears rotate together with the first and second drive shafts about the first and second drive shaft axes, respectively, and a combustion chamber size-varying carriage that is connected to the second drive shaft, the carriage being movable to rotate the second drive shaft axis about an axis of rotation of the third gear.

The internal combustion engine may further comprise a valve-control system that adjusts an amount of air that enters the internal volume, more air being provided for the large power delivery, and less air being provided for the small power delivery, the valve-control system also shifting a phase of air being delivered to the internal volume between the large power delivery and the small power delivery, relative to a phase of the first drive shaft.

The valve-control system may include a support structure, a carriage mounted for movement to the support structure, a cam rotatably mounted to the carriage and having an outer cam surface, a first follower held by the support structure, the first follower having an end surface against fee cam surface so that rotation of the cam causes translation of the first follower, the first follower having a side cam surface, and a second follower having a following surface against the side cam surface so that translation of the first follower causes movement of the second follower.

The internal combustion engine may further comprise a sleeve valve, at least partially around the first piston and being movable between a first position wherein the port is open and a second position wherein the sleeve valve closes the port.

The sleeve valve may move in a primarily linear reciprocating path between the first position, where the port is open, and the second position, where the sleeve valve closes the port.

The port may have a mouth with a seat and the sleeve valve has a surface at an angle other than zero degrees relative to a direction that the sleeve valve travels, the end surface engaging with the seat to close the port.

The internal combustion engine may further comprise a valve-cooling piece that, together with an outer surface of the sleeve valve, defines a valve-cooling passage through which a valve-cooling fluid can pass to cool the sleeve valve.

The invention also provides an internal combustion engine, including a body defining first and second cylinders in communication with one another, first and second pistons in the first and second cylinders respectively, surfaces of the pistons and walls of the cylinders defining an internal volume, at least first and second ports in the body to allow air and fuel into and exhaust gas out of the internal volume, first and second sleeve valves at least partially around the first and second pistons respectively, the first sleeve valve being movable between a first position where the first port is open and a second position where the first sleeve valve closes the first port and fee second sleeve valve being movable between a first position where the second port is open and a second position where the second sleeve valve closes the second port, and first and second drive shafts, each having a bearing section rotatably mounted to the body and each having an offset throw section, the first piston and the bearing section of the first drive shaft being connected such that reciprocating movement of the first piston causes movement of the offset throw section of the first drive shaft about a first drive shaft axis, and the second piston and the bearing section of the second drive shaft being connected such that reciprocating movement of the second piston causes movement of the offset throw section of the second drive shaft about a second drive shaft axis.

The invention further provides an internal combustion engine, including a body defining first and second cylinders, first and second pistons in the first and second cylinders respectively, surfaces of the pistons and walls of the cylinders defining an internal volume, at least one port in the body to allow air and fuel into and exhaust gas out of the internal volume, and first and second drive shafts, each having a bearing section rotatably mounted to the body and each having an offset throw section, the first piston and offset throw section of the first drive shaft being connected and the second piston and the offset throw section of the second drive shaft being connected such that reciprocating movement of the first and second pistons causes rotation of the offset throw sections of the first and second drive shafts about drive shaft axes of the first and second bearing sections respectively, a distance between the drive shaft axes being adjustable to adjust a minimum size of the internal volume.

The invention further provides a valve-control system, including a support structure, a valve-control carriage mounted for movement to the support structure, a cam rotatably mounted to the carriage and having an outer cam surface, a first follower held by the support structure, the first follower having an end surface against the cam surface so mat rotation of the cam causes translation of the first follower, the first follower having a side cam surface, and a second follower having a following surface against the side cam surface so that translation of the first follower causes movement of the second follower.

The invention further provides an internal combustion engine, including a body defining a cylinder, a piston in the cylinder, a surface of the piston and a wall of the cylinder defining an internal volume, at least one port in the body to allow air and fuel into and exhaust gas out of the internal volume, a sleeve valve at least partially around the piston and being movable in a primarily linear reciprocating path between a first position where the port is open and a second position where the sleeve valve closes the port, and a drive shaft having a bearing section rotatably mounted to the body and an offset throw section, the piston and the offset throw section of the drive shaft being connected such that reciprocating movement of the piston causes rotation of the offset throw section of the drive shaft about a crankshaft axis of the drive shaft.

The invention further provides an internal combustion engine, including a body defining a cylinder, a piston in the cylinder, a surface of the piston and a wall of the cylinder defining an internal volume, at least one port in the body to allow air and fuel into and exhaust gas out of the internal volume, a sleeve valve at least partially around the piston and being movable between a first position where the port is open and a second position where the sleeve valve closes the port, an oil path-defining piece adjacent to the sleeve valve, surfaces of the oil path-defining piece and the sleeve valve defining an oil passage, an oil inlet port through the body into the passage, an oil outlet port from the oil passage through the body, and a drive shaft having a bearing section rotatably mounted to the body and an offset throw section, the piston and the offset throw section of the drive shaft being connected, such that reciprocating movement of the piston causes rotation of the offset throw section of the drive shaft about a drive shaft axis of the drive shaft.

The invention further provides an internal combustion engine, including a body defining a cylinder, a piston in the cylinder, a surface of the piston and a wall of the cylinder defining an internal volume, at least one port in the body to allow air and fuel into and exhaust gas out of the internal volume, the port having a mouth with a seat, a sleeve valve at least partially around the piston and being movable between a first position where the port is open and a second position where the sleeve valve closes the port, the sleeve valve having an end surface at an angle other than zero degrees relative to a direction that the sleeve valve travels, the end surface engaging with the seat to close the port, and a drive shaft having a bearing section rotatably mounted to the body and an offset throw section, the piston and the offset throw section of the drive shaft being connected such that reciprocating movement of the piston causes rotation of the offset throw section of the drive shaft about a drive shaft axis.

The invention further provides an internal combustion engine, including a body defining a cylinder, a fuel supply cavity, and a fuel outlet port connecting the fuel supply cavity to the cylinder, a piston in the cylinder, a surface of the piston and a wall of the cylinder defining an internal volume, at least one air inlet port in the body to allow air into the internal volume, a valve which is movable between a first position, wherein the air inlet port and fuel outlet port are open, and a second position where the valve closes the air inlet port and fuel outlet port, and a drive shaft having a bearing section rotatably mounted to the body and an offset throw section, the piston and the offset throw section of the drive shaft being connected such that reciprocating movement of the piston, causes rotation of the offset throw section of the drive shaft about a drive shaft axis.

The invention further provides an internal combustion engine, including a body defining a cylinder, a piston held in the cylinder such that an internal volume is defined by a wall of the cylinder and a surface of the piston, at least one port in the body, to allow air and fuel into the internal volume and exhaust gas out of the internal volume, a drive shaft having a bearing section rotatably mounted to the body and an offset throw section, the piston and the offset throw section of the drive shaft being connected such that reciprocating movement of the piston causes rotation of the offset throw section of the drive shaft about the drive shaft axis of the drive shaft, a valve which is movable between a first position where the port is open and a second position where the valve closes the port, a component connected to the sleeve valve, the component having a surface which, when pressure is applied thereto, moves the valve into the second position, a valve-pressure reservoir, having a side piece, a spring connected to the side piece and acting on the side piece to maintain an elevated pressure within the valve-pressure reservoir, a high-pressure reservoir containing fluid at a higher pressure than the valve-pressure reservoir, and a valve that is movable between a first position wherein the high-pressure reservoir is connected to the surface and the valve-pressure reservoir is disconnected from the surface, and a second position wherein the high-pressure reservoir is disconnected from the surface and tire valve-pressure reservoir is connected to the surface.

The invention further provides an internal combustion engine, including a body defining a cylinder, a piston in the cylinder, surfaces of the piston and walls of the cylinder defining an internal volume, at least one port in the body to allow air and fuel into and exhaust gas out of the internal volume, a drive shaft having a bearing section mounted for rotation on a drive shaft axis through the body, and having an offset throw section, the piston and the offset throw section of the drive shaft being connected such that reciprocating movement of the piston increases and decreases a size of the internal volume between minimum and maximum sizes and causes rotation of the offset throw section of the drive shaft-about the drive shaft axis, and a knock sensor to detect pre-ignition within the internal volume, and a feedback system that adjusts the minimum size of the internal volume based on pre-ignition detected by the knock sensor.

The invention further provides an internal combustion engine, comprising a body defining a cylinder, a piston in the cylinder, surfaces of the piston and walls of the cylinder defining an internal volume, at least one port in the body to allow air and fuel into and exhaust gas out of the internal volume, a drive shaft having a bearing section mounted for rotation on a drive shaft axis, and having an offset throw section, the piston and the offset throw section of the drive shaft being connected, such that reciprocating movement of the piston increases and decreases a size of the internal volume between minimum and maximum sizes, and causes rotation of the offset throw section of the drive shaft about the drive shaft axis, first and second spark plugs, having first and second electrodes respectively, and an ignition system connected between the first and second electrodes, the ignition system providing a positive voltage on the first electrode and a negative voltage on the second electrode, such that a voltage differential is created between the first and second electrodes to create a spark within die internal volume.

The invention further provides an internal combustion engine, including a body defining a cylinder, a piston, held in the cylinder such that an internal volume is defined by a wall of the cylinder and a surface of the piston, at least one port in the body to allow air and fuel into the internal volume and exhaust gas out of the internal volume, a drive shaft bearing on the body, a drive shaft having a bearing section mounted for rotation, to the drive shaft bearing, and an offset throw section that moves in a circular path about an axis of the drive shaft bearing, and a connecting rod having first and second ends connected to the piston and the offset throw section of the drive shaft, respectively, such that reciprocating movement of the piston due to combustion of the fluid in the internal volume causes movement of the offset throw section of the drive shaft in the circular path.

The invention further provides an internal combustion engine, including a body defining a cylinder, at least one piston, a surface of the at least one piston and a wall of the cylinder defining an internal volume, at least one port in the body to allow air and fuel into and exhaust gas out of the internal volume, and a drive shaft having a bearing section rotatably mounted to the body and an offset throw section, the piston and the offset throw section of the drive shaft being connected, such that reciprocating movement of the piston causes rotation of the offset throw section of the drive shaft about a drive shaft axis of the drive shaft, wherein during an intake stroke of the at least one piston the said at least one valve remains open to allow air into the combustion chamber for a first preselected length of the intake stroke, and during an expansion stroke of the at least one piston, the said at least one valve maintains the combustion chamber substantially closed for a second length of the expansion stroke, the second length being more than the first length, and wherein energy that is transferred through the at least one piston to a drive train and with energy losses in an exhaust cycle of the at least one piston together are more than 65% of energy of the fuel in the cylinder.

BRIEF DESCRIPTION OF THE DRAWINGS

The invention is described by way of example with reference to the accompanying drawings, wherein:

FIG. 14 is a cross-sectional side view illustrating the use of a flexible bellow seal used in an internal combustion engine according to a further embodiment of the invention.

DETAILED DESCRIPTION OF THE INVENTION

Figure 1:
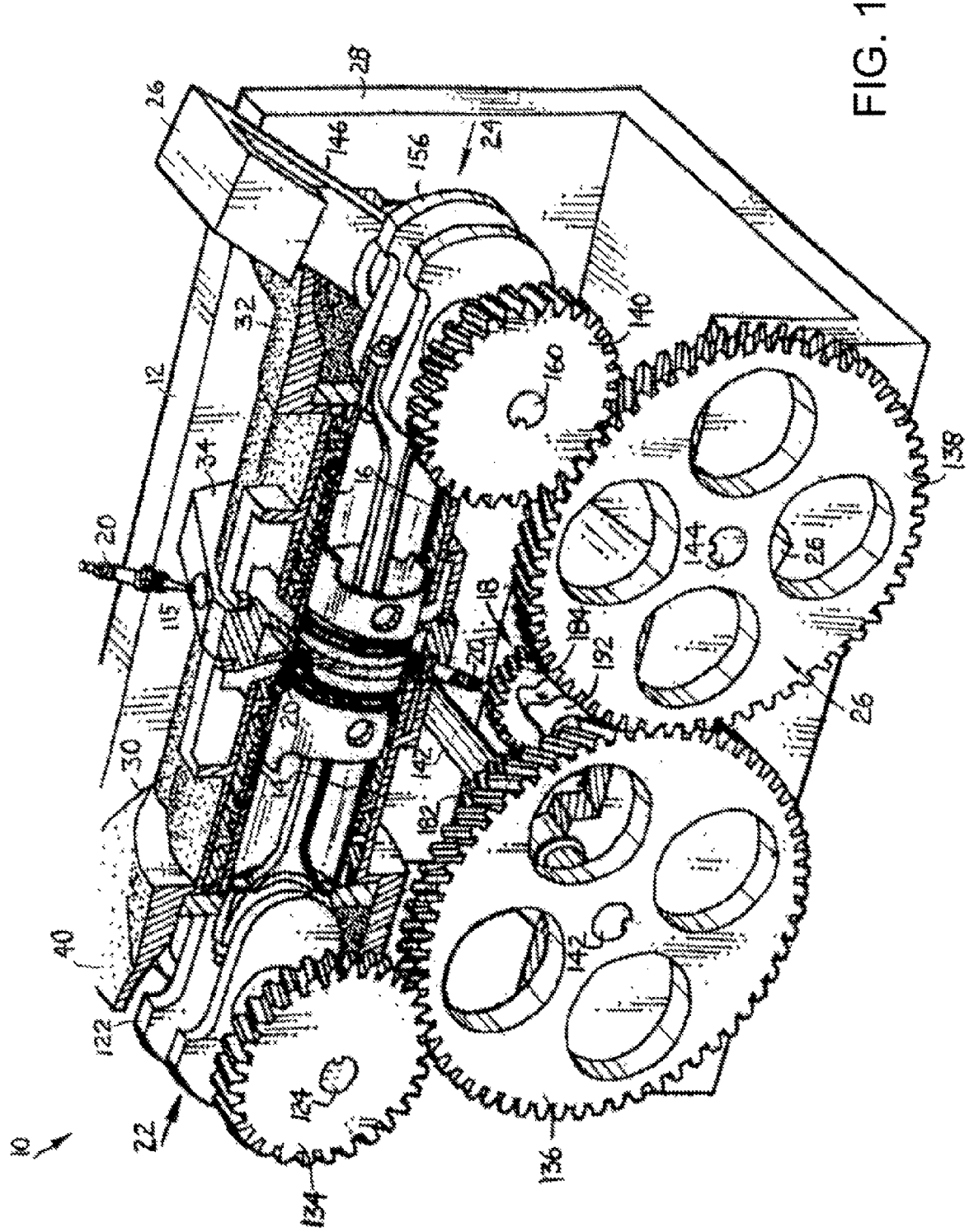
FIG. 1 is a perspective view of an internal combustion engine, according to an embodiment of the invention.

FIG. 1 of the accompanying drawings illustrates components of an internal combustion engine 10, according to an embodiment of the invention, including a body 12, left and right valve arrangements 14 and 16, components of a valve-control system 18, spark plugs 20, left and right power delivery arrangements 22 and 24, respectively, and a combustion chamber size-varying mechanism 26.

The body 12 includes a base portion 28, left and right castings 30 and 32, and a central connecting piece 34. The left and right castings 30 and 32 are mounted to the central connecting piece 34. The assembly, including the left and right castings 30 and 32 and the central connecting piece 34, is then secured to the base portion 28 to form a unitary piece with the base portion 28, the castings 30 and 32 and the central connecting piece 34 being immovably connected to one another.

Figure 2:
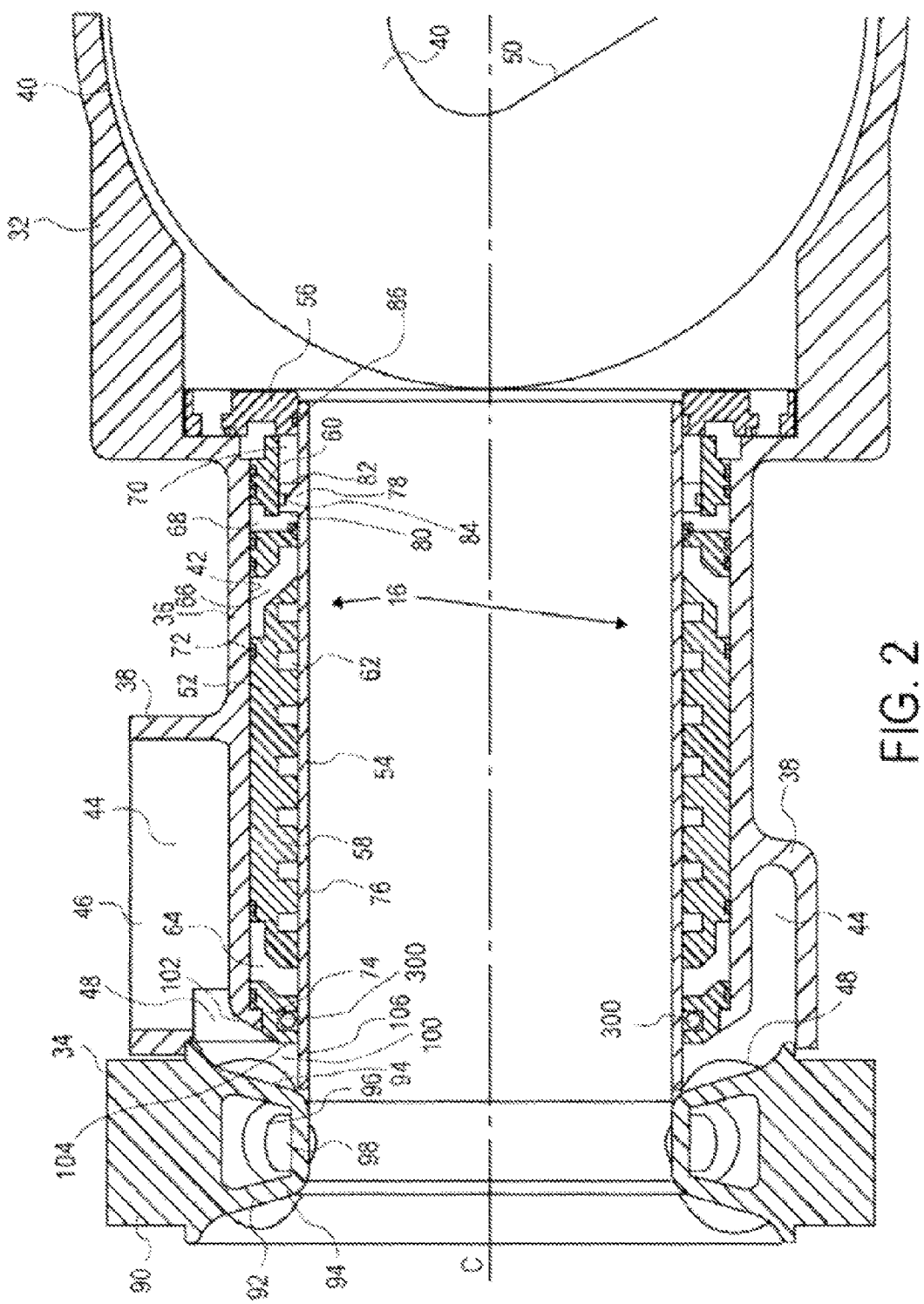
FIG. 2 is a cross-sectional side view of a right valve arrangement, a right casting, and a central connecting piece forming part of the engine of FIG. 1.

As shown in FIG. 2, the right casting 32 includes a cylinder block portion 36, an air intake and distribution portion 38, and a crankshaft housing 40. The cylinder block portion 36 has a circular bore 42 machined from right to left therein. The air intake and distribution portion 38 forms a volute 44 around a left section of the cylinder block portion 36. The volute 44 has an inlet 46 at the top. Left ends of the cylinder block portion 36 and the air intake and distribution portion 38 form a circumferential outlet 48 out of a left side of the volute 44.

The crankshaft housing 40 is an extension from the cylinder block portion 36, and is larger in size than the cylinder block portion 36. One of two drive shaft openings 50 is shown in the cross-section of FIG. 2.

The right valve arrangement 16 includes an oil path-defining piece 52, a sleeve valve 54, and a retaining piece 56.

The oil path-defining piece 52 is inserted from right to left into the circular bore 42. The oil path-defining piece 52 is formed into a valve-cooling portion 58 on the left, and a valve-actuation portion 60 on the right. The valve-cooling portion 58 has a helical groove 62 formed in an inner surface thereof, and inlet and outlet grooves 64 and 66, respectively, formed in an outer surface thereof. The inlet and outlet grooves 64 and 66 are in communication with opposing ends of the helical groove 62. The valve-actuation portion 60 has oil pressure slots 68 and 70 formed therein. The oil path-defining piece 52 is inserted into the circular bore 42 until a seat 74 on the oil path-defining piece 52 contacts a seat on the cylinder block portion 36, and is prevented from further movement into the circular bore 42. An enclosed cavity is then defined by the inlet groove 64 and a surface of the circular bore 42. Similarly, cavities are defined by the outlet groove 66 and a surface of the circular bore 42 and by the oil pressure slots 68 and 70 and surfaces of the circular bore 42.

The sleeve valve 54 is inserted from right to left into the oil path-defining piece 52. The sleeve valve 54 has a sleeve portion 76 and a ridge component 78 around and close to a right end of the sleeve portion 76. An enclosed helical oil-cooling passage is defined by an outer surface of the sleeve portion 76, and by surfaces of the helical groove 62. Left and right surfaces 80 and 82, respectively, on the ridge component 78 complete the cavities formed by the oil pressure slots 68 and 70. The sleeve valve 54 is slidably movable to the right and back to the left relative to the oil path-defining piece 52. An O-ring 84 is located between the ridge component 78 and the valve-actuation portion 60 to allow for sliding movement of the ridge component 78 relative to the valve-actuation portion 60.

The retaining piece 56 is in the form of a ring having an outer diameter substantially larger than the oil path-defining piece 52, and an inner diameter that is only slightly larger than an outer diameter of the sleeve portion 76. The retaining piece 56 is located over a right end of the sleeve portion 76, so that a right end of the oil path-defining piece 52 abuts against a left surface of the retaining piece 56. The retaining piece 56 is then secured to the right casting 32 to retain the oil path-defining piece 52 in position. Bolts may be used to releasably secure the retaining piece 56 to the right casting 32, to allow for removal and maintenance of the oil path-defining piece and the sleeve valve 54. An O-ring 86 is located between an inner diameter of the retaining piece 56 and an outer surface of the right end of the sleeve portion 76, to allow for sliding movement of the sleeve portion 76 past the retaining piece 56.

The O-ring 86 seals the cavity that is formed in part by the right surface 82, one of the oil pressure slots 70, and an outer surface of the sleeve portion 76, so that oil cannot leak therefrom, while still allowing for sliding movement of the sleeve portion 76 relative to the retaining piece 56.

The central connecting piece 34 is in the form of a ring having an outer portion 90 and an inner portion 92. The inner portion 92 has opposing side surfaces 94 that taper toward one another. A fuel supply cavity 96 forms a volute within the inner portion 92 and around a horizontal central axis C of the central connecting piece 34. The central connecting piece 34 further includes spark plug sleeves 98, through which spark plugs can be inserted through the fuel supply cavity 96 without coming into contact with any fuel in the fuel supply cavity 96.

When the right casting 32 is mounted to the central connecting piece 34, an air inlet port 100 is defined between one of the side surfaces 94 on one side, and by end surfaces 102 and 104 of the cylinder block portion 36 and the oil path-defining piece 52 on the other side. The air inlet port 100 is a ring-shaped port around a horizontal central axis C of the sleeve valve 54. The air inlet port 100 extends from the outlet 48 of the air intake and distribution portion 38, and has a mouth 106 at a left end of the sleeve portion 76. Movement of the sleeve valve 54 to the right opens the mouth 106, and movement to the left closes the mouth 106.

Figure 3:
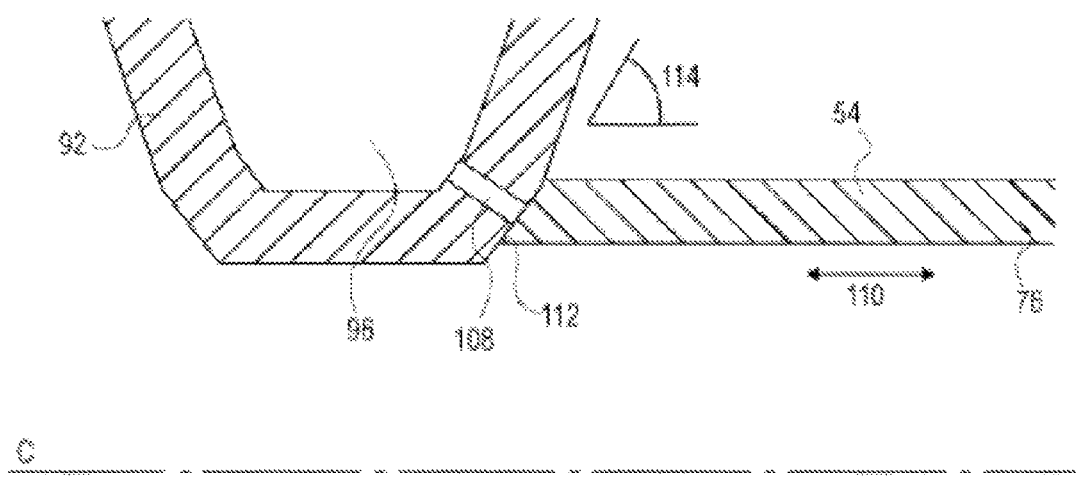
FIG. 3 is a cross-sectional side view of components shown in FIG. 2 where fuel enters into an internal volume of the engine.

As shown in FIG. 3, a fuel outlet port 108 is formed from the fuel supply cavity 96 through a wall of the inner portion 92. The sleeve portion 76 moves in a direction 110 to the right and to the left along a primarily linear reciprocating path. The sleeve valve 54 is capable of moving in a perfectly linear path, although forces created by oil and freedom of the sleeve valve 54 to rotate about a horizontal control axis C may cause slight rotation of the sleeve valve 54. An end surface 112 of the sleeve portion 76 is at an angle 114 of approximately 45 degrees relative to the direction 110. The inner portion 92 has a corresponding seat against which the end surface 112 abuts. When the end surface 112 is against the seat of the inner portion 92, the fuel outlet port 108 is closed. Movement of the sleeve portion 76 away from the seat opens the fuel outlet port 108. What should be noted is that the fuel outlet port 108 is not mirrored on the left of the inner portion 92. Multiple fuel outlet ports, similar to the fuel outlet port 108, are formed in a ring around a horizontal center line C of the inner portion 92.

In an alternate embodiment a fuel injector may be used to inject fuel directly or air and fuel can be mixed externally. In such alternate embodiments water can be used within a cavity such as the cavity 96 for purposes of cooling a sleeve valve.

Referring again to FIG. 1, the left casting 30 and left valve arrangement 14 are a mirror image of the right casting 32 and the right valve arrangement 16, respectively, with two notable structural differences. First, as alluded to with reference to FIG. 2, a drive shaft opening such as the drive shaft opening 50 is not provided; instead, a circular bearing mounting is provided on each side of the crankshaft mounting portion of the left casting 30. Second, the left sleeve valve arrangement 14 does not control the flow of fuel out of the fuel supply cavity 96 because, as described with reference to FIG. 3, there are no fuel outlet ports on the left of the inner portion 92. As discussed with reference to FIG. 2, an air inlet port 100 is formed on the right of the central connecting piece 34. A similar construction forms an air outlet port on the left of the central connecting piece 34. Typically the sleeve valve 54 over the exhaust port will not open as far as the air inlet port 100, because gas moves faster when it is hot. It is also easier to cool the sleeve valve forming the exhaust if the port is shorter.

Figure 4:
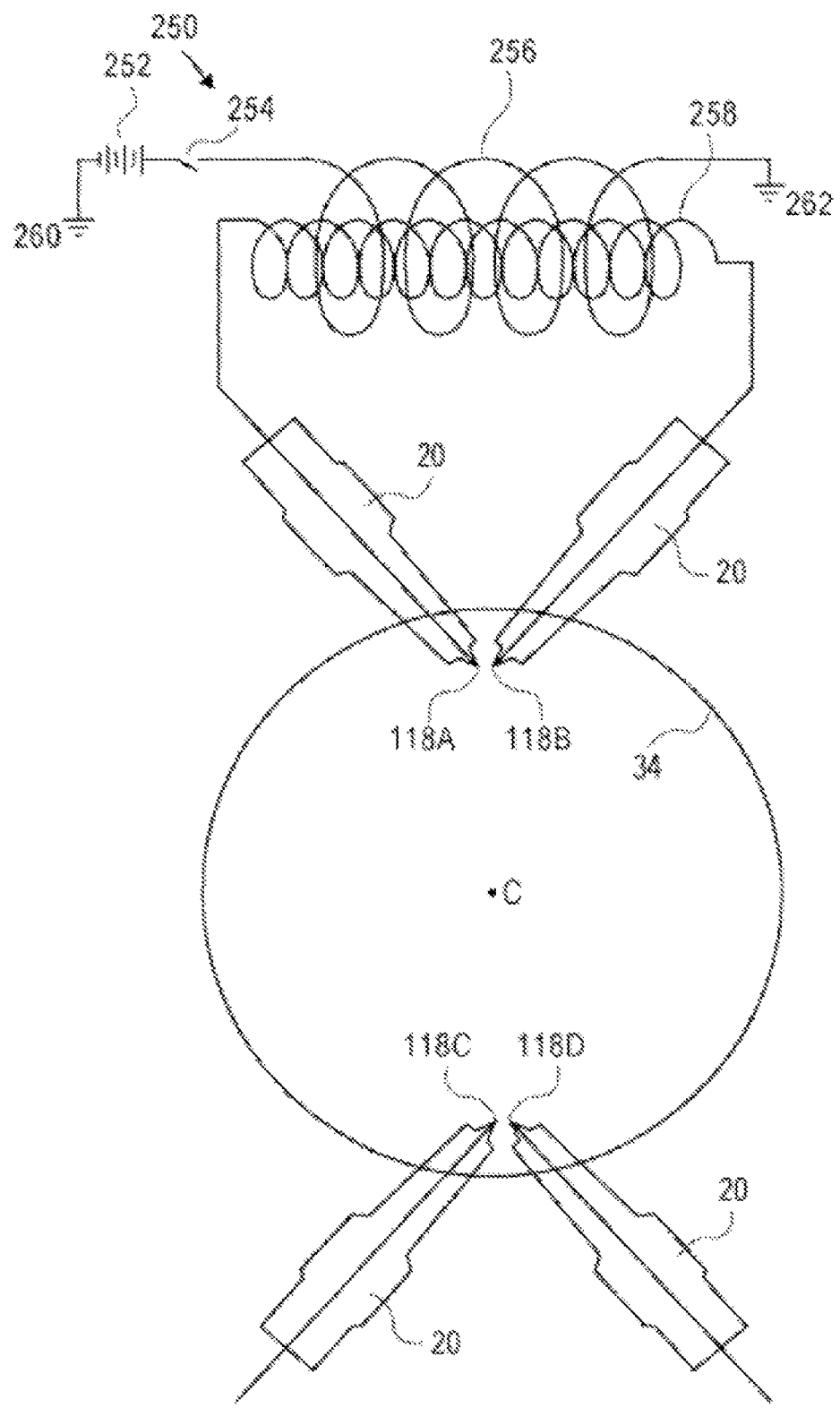
FIG. 4 is an end view illustrating the positioning of spark plugs of the engine.

FIG. 1 shows three of four spark plugs 20 that are located around a horizontal central axis C of the central connecting piece 34. FIG. 1 also shows one of four spark plug openings 115 through which a respective spark plug 20 is inserted into the central connecting piece 34. The respective spark plug 20 then passes through a respective one of the sleeves 98 shown in FIG. 2, and an electrode of the spark plug protrudes from an inner surface of the inner portion 92. As shown in FIG. 4, one pair of the spark plugs 20 has electrodes 118A and 118B together at the top, and the other pair of the spark plugs 20 has their electrodes 118C and 118D together at the bottom. A positive high voltage may, for example, be provided to the electrode 118A and a negative high voltage to the electrode 118B, and a spark be created between the electrodes 118A and 118B. Simultaneously, a positive high voltage can be provided to the electrode 118C and a negative high voltage to the electrode 118D to create a spark between the electrodes 118C and 118D.

FIG. 4 further illustrates an ignition system 250, including a voltage supply 252, a switch 254 that is driven by a distributor or a computer, a primary winding 256, and a secondary winding 258. The voltage supply 252, the switch 254, and the primary winding 256 are connected in series between two ground contacts 260 and 262. The secondary winding 258 is located in a position to be induced by the primary winding 256, and is connected between the electrodes 118A and 118B.

In use, the switch 254 connects the voltage supply 252 to the primary winding 256, and creates a voltage over the primary winding 256. The secondary winding 258 is induced, so that a voltage is created over the secondary winding 258. One end of the secondary winding 258 has a positive voltage, and an opposing end of the secondary winding 258 has a negative voltage.

High negative and positive voltages can be generated simply by having one end of the secondary winding 258 connected to one electrode 118A, while the other end of the secondary winding 258 is connected to another electrode 118B. The primary winding 256 operates normally between the system ground contacts 260/262 and the voltage supply 252. In this way there are no high-voltage connections to the system ground contacts 260/262. Additionally, the insulation requirements are reduced by half. For a given high-voltage delta between the electrodes 118A and 118B, only half that voltage is developed between either electrode (e.g., 118B) and the ground contact 260/262.

Figure 5:
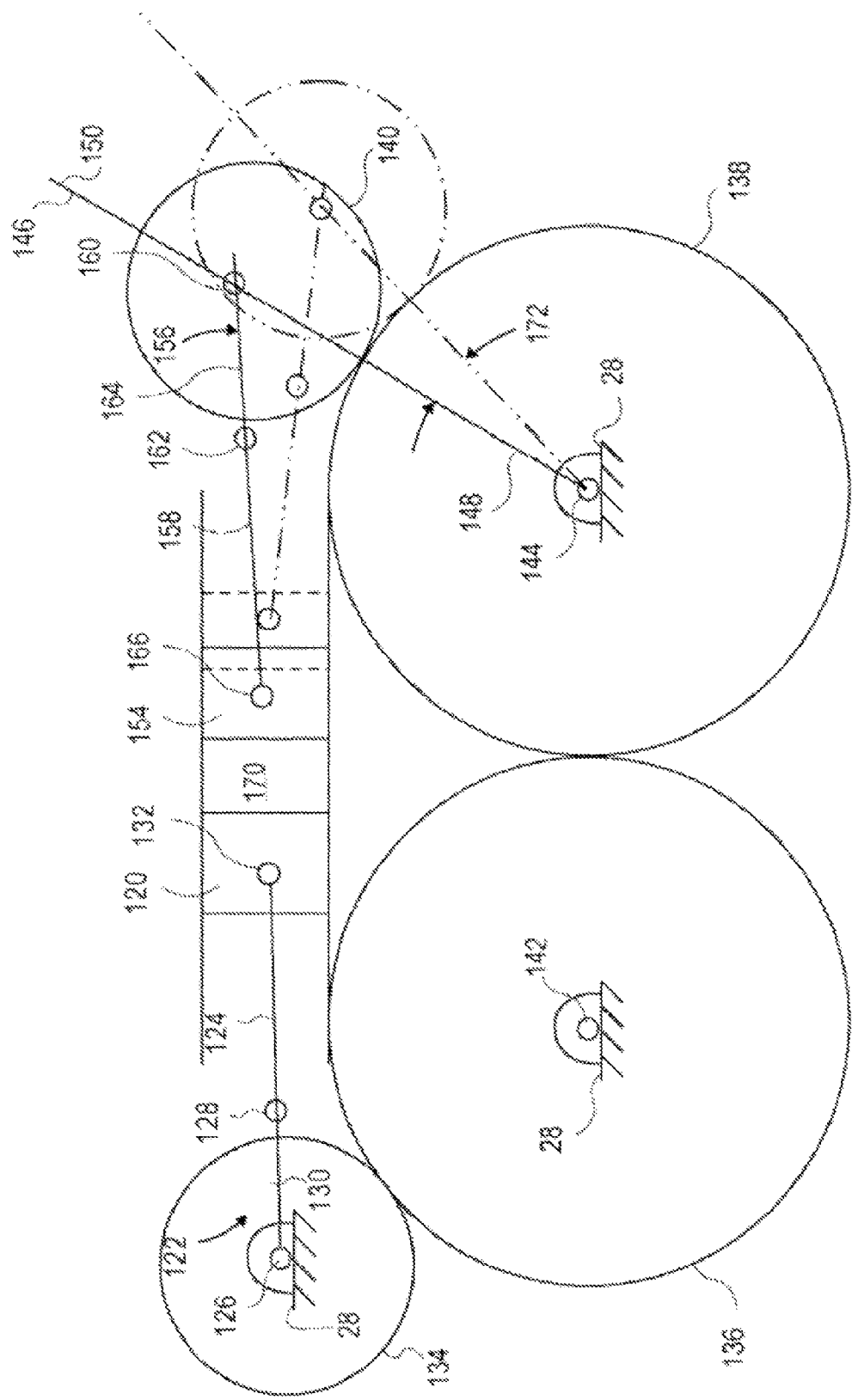
FIG. 5 is a schematic side view illustrating the assembly of power-delivery arrangements and a combustion chamber size-varying mechanism of the engine.

Reference is now made to FIGS. 1 and 5 in combination. In order not to obscure the drawings, not every detail in FIG. 1 is shown in FIG. 5, and not every detail in FIG. 5 is shown in FIG. 1. In general, FIG. 1 shows only general large assemblies, and FIG. 5 shows the components better that make up the larger assemblies.

The left power delivery arrangement 22 includes a left piston 120, a left crankshaft 122, and a left connecting rod 124. The left crankshaft 122 has opposing bearing sections 126 (the bearing sections 126 are located behind one another into the paper), an offset throw section 128, and connecting sections 130 that connect the offset throw section 128 to the bearing sections 126. The bearing sections 126 are rotatably mounted on journal bearings (not shown) in the crankshaft housing 40 of the left casting 30. The entire left crankshaft 122 revolves about a left crankshaft axis through the bearing sections 126 that rotate on the journal bearings.

The left piston 120 resides within the left casting 30, and is slidably movable to the left and to the right on an inner surface of the sleeve valve 54 of the left valve arrangement 14. A left connecting pin 132 is secured to the left piston 120. The left connecting rod 124 has opposing ends that are pivotably connected to the offset throw section 128 of the left crankshaft 122, and to the left connecting pin 132. Rotation of the left crankshaft 122 causes reciprocating movement of the piston 120 by a distance that equals two times a distance from the bearing sections 126 to the offset throw section 128 of the left crankshaft 122.

Another embodiment may or may not have all the components of the left power delivery arrangement. A cam-based connection may, for example, be provided. In a cam-based arrangement no connecting rod is provided and a cam serves the purpose of moving a piston.

The combustion chamber size-varying mechanism 26 includes a train of first, second, third, and fourth gears 134, 136, 138, and 140 respectively, first and second gear shafts 142 and 144, respectively, and a combustion chamber size-varying carriage 146. The first gear 134 is mounted to one bearing section 126 of the left crankshaft 122. Splines on the first gear 134 and the bearing section 126 of the left crankshaft 122 ensure that the first gear 134 does not slip on the bearing section 126 of the left crankshaft 122, and that the first gear 134 thus rotates together with the left crankshaft 122. The first and second gear shafts 142 and 144 are rotatably mounted through respective bearings to the base portion 28. The spatial relationship between the bearing sections 126 of the left crankshaft 122 and the first and second gear shafts 142 and 144 is fixed, because they are all mounted to the same base portion 28. The second and third gears 136 and 138 are mounted to and rotate with the first and second gear shafts 142 and 144, respectively. The second gear 136 meshes with the first gear 134, and the third gear 138 meshes with the second gear 136. An effective working diameter of the first gear 134 is exactly two times an effective working diameter of the second gear 136, and the third gear 138 has the same effective working diameter as the second gear 136. The second gear 136 also has exactly twice as many teeth as the first gear 134, and the third gear 138 has the same number of teeth as the second gear 136. The second and third gears 136 and 138 thus rotate at exactly half tire rotational speed of the first gear 134.

The combustion chamber size-varying carriage 146 has first and second opposed ends 148 and 150, respectively. The first end 148 is pivotably secured to the second gear shaft 144, so that the second end 150 can move on a radius with a center point at the center line of the second gear shaft 144.

The right power delivery arrangement 24 includes a right piston 154, a right crankshaft 156, and a right connecting rod 158. The right piston 154 is located within and slides up and down the sleeve valve 54 in FIG. 2. The right crankshaft 156 has opposing bearing sections 160, an offset throw section 162, and connecting sections 164 that connect the offset throw section 162 to the bearing sections 160. A right connecting pin 166 is secured to the right piston 154. The right connecting rod 158 has opposed ends that are pivotably secured to the right connecting pin 166 and the offset throw section 162 of the right crankshaft 156. The bearing sections 160 of the right crankshaft 156 are rotatably secured on respective journal bearings (not shown) to the combustion chamber size-varying carriage 146. The entire right crankshaft 156 can rotate on a right crankshaft axis through the bearing sections 160. Rotation of the right crankshaft 156 causes reciprocating movement of the right piston 154. A distance that the right piston 156 travels is equal to or close to twice a distance from the crankshaft axis through the right bearing sections 160 to an axis of the offset throw section 162.

An internal volume 170 is defined between facing surfaces of the left and right pistons 120 and 154, and by inner surfaces of the central connecting piece 34 and the left and right valve arrangements 14 and 16. FIGS. 1 and 5 show the left and right crankshafts 120 and 156 rotated to respective angles so that the left and right pistons 120 and 154 are at their farthest positions from the bearing sections 126 and 160, respectively, and the internal volume 170 is at its smallest. Pivoting of the combustion chamber size-varying carriage 146 through an angle 172 rotates the bearing section 160 of the right crankshaft 156 through the angle 172 about the second gear shaft 144. Rotation of the bearing section 160 of the right crankshaft 156 to the right causes movement of the right piston 154 to the right. Movement of the right piston 154 to the right enlarges the internal volume 170. It should be noted that it is the combustion chamber, i.e., the minimum size of the internal volume 170 that is enlarged, i.e., when the right crankshaft 156 is in an angular position wherein the right piston 154 is the farthest from the bearing section 160 of the right crankshaft 156. An enlargement of the minimum size of the internal volume 170 also causes a corresponding increase in a maximum size of the internal volume 170.

The fourth gear 140 is mounted to the bearing section 160 of the right crankshaft 156 so as to rotate together with the right crankshaft 156. The fourth gear 140 meshes with the third gear 138. The fourth gear 140 has exactly half the number of teeth of the third gear 138, and has an effective diameter that is exactly half the effective diameter of the third gear 138. The first and fourth gears thus rotate at the same angular velocity, but in opposite directions. The pistons 120 and 154 move away and toward one another. Movement of the pistons 120 and 154 is approximately in phase, and the only difference in phase between the pistons 120 and 154 is small and due to pivoting of the combustion chamber size-varying carriage 146 through the angle 172.

Figure 6:
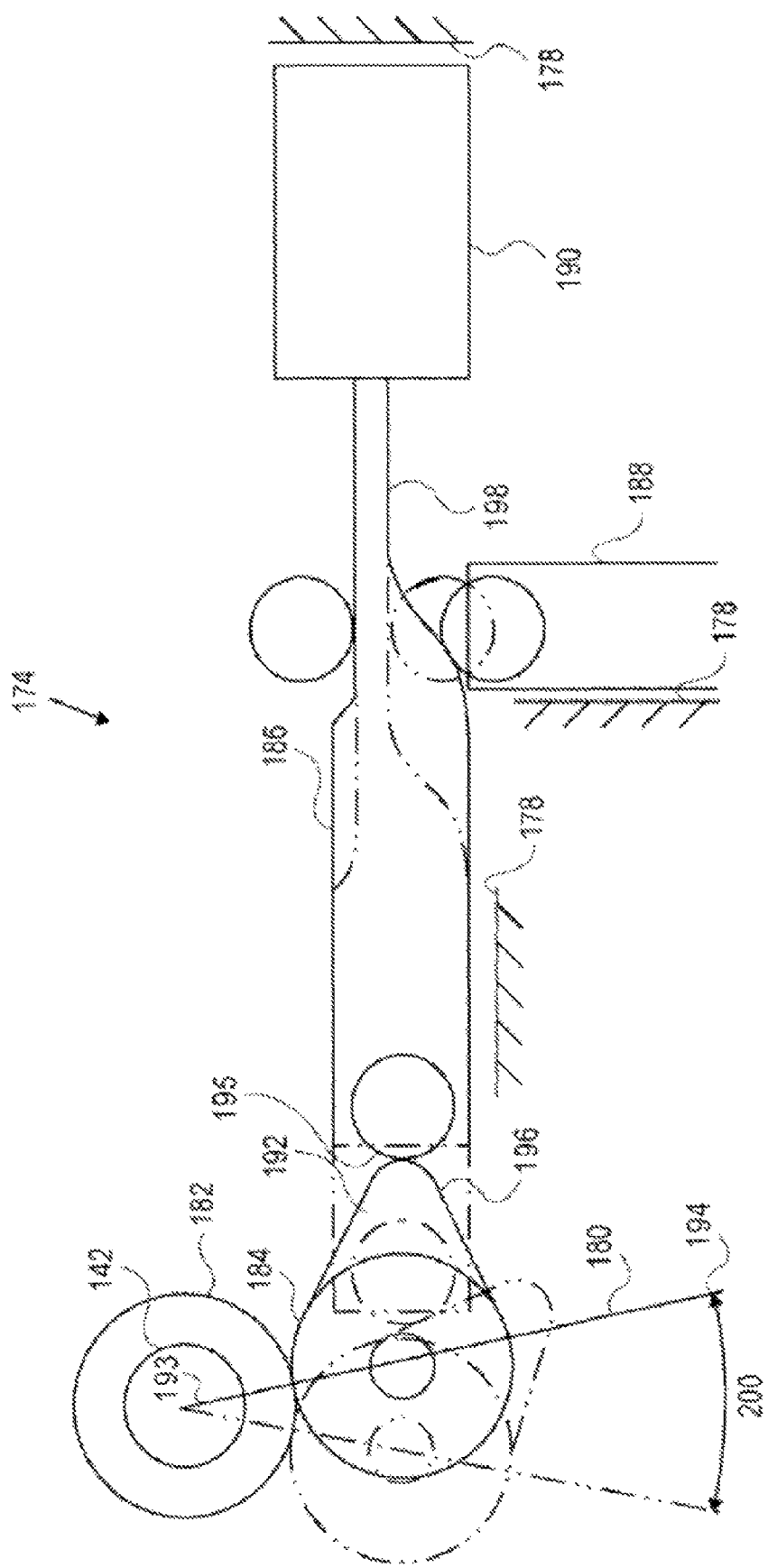
FIG. 6 is a schematic side view Illustrating a valve-control system of the engine.

FIG. 6 illustrates a valve-control system 174 that is used for controlling operation of the sleeve valve 54 of the right valve arrangement 16 shown in FIG. 2. The valve-control system 174 includes a support structure 178, a valve-control carriage 180, first and second cam drive gears 182 and 184, first and second followers 186 and 188, a return spring arrangement 190, and a cam 192.

The valve-control carriage 180 has first and second ends 193 and 194, respectively. The first end 193 is pivotably secured to the first gear shaft 142 (see FIGS. 1 and 5). The first cam drive gear 182 is also secured to the first gear shaft 142, and is driven by the first gear shaft 142. The second cam drive gear 184 is rotatably secured to the valve-control carriage 180. The first and second drive gears 182 and 184 have the same effective diameter and have the same number of teeth, so that they rotate at the same rotational speed of the second gear 136, and half the rotational speed of the left crankshaft 122 and the right crankshaft 156. One skilled in the art would thus appreciate that the rotational speed of the second cam drive gear is correct for controlling four-stroke operation. In an alternate embodiment each one of the gears 182, 183, 136 and 138 may have a prime number of teeth to reduce wear.

The cam 192 is secured to and rotates with the second cam drive gear 184 relative to the valve-control carriage 180. The support structure 178 is immovably secured to the body 12 (see FIG. 1). The first follower 186 is mounted for linear translation movement to the support structure 178, and has a first end 195 against the cam 192. The return spring arrangement 190 is mounted to an opposite end of the first follower 186, and to the support structure 178. The return spring arrangement 190 provides a spring force that biases the first follower 186 toward the cam 192. The second follower 188 is mounted for linear translation movement to the support structure 178 in a direction that is at 90 degrees relative to a direction of travel of the first follower 186.

The cam 192 has an outer surface 196 with a profile, so that one cycle of the cam 192 causes one cycle of the first follower 186 back and forth on its linear path. The first follower 186 has a side surface 198 that is profiled. An end of the second follower 188 rides on the side surface 198. One cycle of the first follower 186 causes one cycle of the second follower 188 on its linear path.

Figure 7:
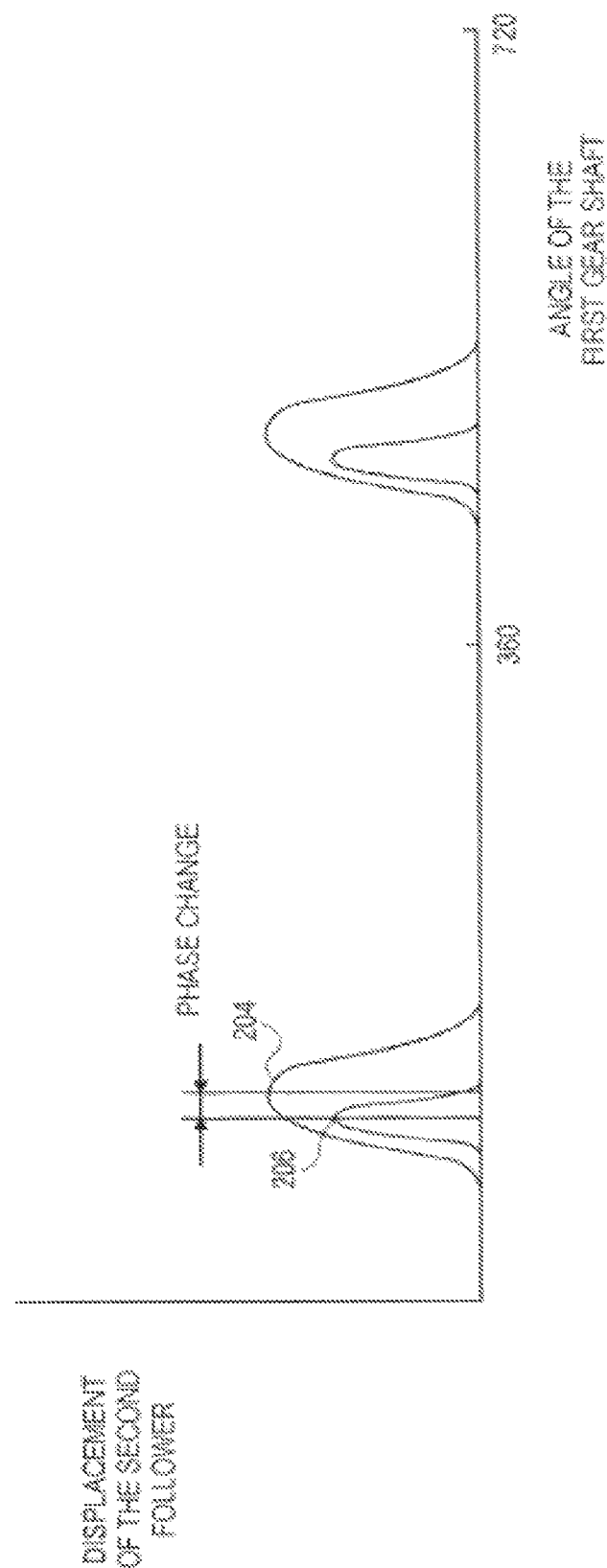
FIG. 7 is a graph illustrating functioning of the valve-control system of FIG. 6.

Pivoting of the carriage 180 through an angle 200 rotates a center point of the second cam drive gear 184 from a first position to a second position through the angle 200 relative to the support structure 178. The return spring arrangement 190 causes corresponding movement of the first follower 186 to the left, so that the end of the first follower 186 remains in contact with the outer surface 196 of the cam 192. Rotation of the cam 192 still causes linear movement of the first follower 186 on a linear path. Movement of the carriage 180 through the angle 200 also moves the profile of the side surface 198 to the left. Because of movement of the profile of the side surface 198 to the left, the second follower 188 rides on a flat portion of the side surface 198 for a longer period of time during a cycle of the first follower 186. As can be seen in FIG. 7, movement of the valve-control carriage 180 in FIG. 6 causes displacement of the second follower 188 for a shorter angle of rotation of the cam 192. What should also be noted is that there is a slight advancement in time of the phase of the second follower 188 relative to a phase of the first cam drive gear 182, which is due to the second cam drive gear 184 that rolls in a clockwise direction relative to a stationary position of the first cam drive gear 182 upon clockwise pivoting of the valve-control carriage 180. The angle of the cam 192 at which the second follower 188 begins to move remains substantially unchanged, due to the phase change. The carriage 180 can also be pivoted past its second position to a third position, so that the side surface 198 moves so far to the left that the second follower 188 rides on the flat portion of the side surface 198 all the time during a complete cycle of the first follower 186.

The second follower 188 is connected through a hydraulic system (not shown) to the oil pressure slot 68 in FIG. 2, so that movement of the second follower 188 causes oil to flow into and out of the oil pressure slot 68. Because of the movement-limiting, phase-changing movement of the second follower 188, the movement and phase of the sleeve valve 54 can be modulated. Modulation of the movement of the sleeve valve 54 means that air intake through the air inlet port 100 and fuel intake through the fuel inlet port shown in FIG. 3 can be modulated.

Referring to FIG. 1, the left valve arrangement 14 serves merely as an exhaust. The internal combustion engine 10, in addition, to the valve-control system 174 of FIG. 6, also has a valve-control system 174 for controlling the left valve arrangement 14. However, because less control is required over exhaust, the valve-control system used for controlling the left valve arrangement 14 does not require movement limiting or phase change of the sleeve valve of the left valve arrangement 14.

Full-power operation of the internal combustion engine is now described, primarily with reference to FIGS. 8A through 8G, and with the aid of all of the other figures heretofore described. During full-power operation, the combustion chamber size-varying carriage 146 in FIGS. 1 and 5 is pivoted clockwise to the right so that the right piston 154 is in the location of the phantom lines in FIG. 5 when the internal volume 170 is at its smallest. During full-power operation, the valve-control carriage in FIG. 6 is rotated counter-clockwise to the right.

Figure 8A:
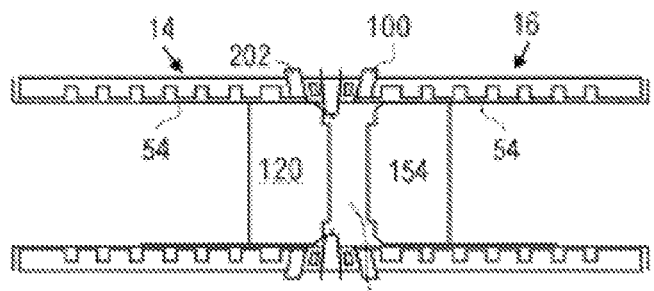
FIGS. 8A through 8G are cross-sectional side views illustrating full-power operation of the engine.

FIG. 8A now illustrates the position of the left and right pistons 120 and 154 at ignition and when the size of the internal volume 170 is at its smallest for full-power operation. Referring to FIG. 6, the end of the first follower 186 rides on a circular portion of the outer surface 196 of the cam 192, and has thus not been displaced to the right. The second follower 188 is in its uppermost position against the side surface 198. The sleeve valve 54 is maintained toward the left, wherein the sleeve portions 76 close the air inlet port 100. Referring to FIG. 3, the end surface 112 is against the seat on the inner portion 92, and closes the fuel outlet port 108. With further reference to FIG. 8A, a sleeve valve 54 of the left valve arrangement 14 closes an exhaust port 202. The internal volume 170 is filled with pressurized air and fuel, typically vaporized petroleum. Referring to FIG. 4, a current is provided to the electrodes 118 of the spark plugs 20, which ignites the fuel. Ignition causes combustion, and an increase in pressure within the internal volume 170. The increased pressure moves the left piston 120 to the left, and the right piston 154 to the right.

Figure 8B:
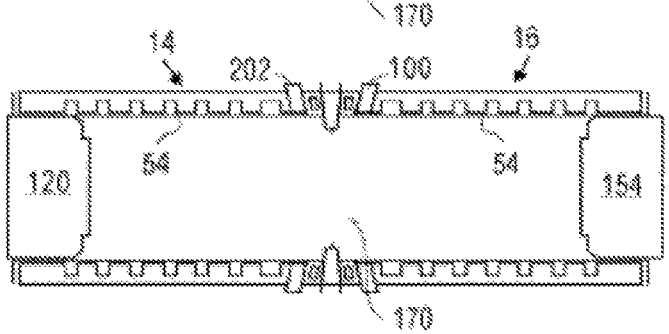

FIG. 8B illustrates the left and right pistons 120 and 154 after the end of expansion of the internal volume 170 due to the increased pressure of combustion. The expansion causes a reduction in pressure and temperature within the internal volume 170. With reference to FIG. 5, expansion of the internal volume 170 causes rotation of the left crankshaft 122 in a clockwise direction, and rotation of the right crankshaft 156 in a counterclockwise direction. A force that is generated through the connecting rod 122 creates a clockwise torque on the bearing sections 126. An extension of one of the bearing sections 126 can form an output shaft through which the torque can be delivered to a drive train. A force created by the right connecting rod 158 creates a counterclockwise torque on the right bearing section 160. The torque created on the right bearing section 160 is provided to the fourth gear 140. The counterclockwise torque on the fourth gear 140 is provided through the third and second gears 138 and 136 sequentially as a clockwise torque on the first gear 134. The clockwise torque created on the first gear 134 is provided to the first bearing section 126 and added to the torque due to the left connecting rod 124.

Figure 8C:
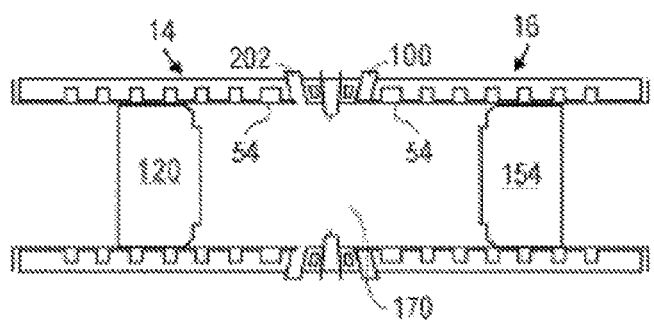

FIG. 8C illustrates the left and right pistons 120 and 154 midway through exhaust. The sleeve valve 54 of the left valve arrangement 14 has been moved to the left to open the exhaust port 202. The internal volume 170 reduces in size, and combusted gas discharges through the exhaust port 202.

Figure 8D:
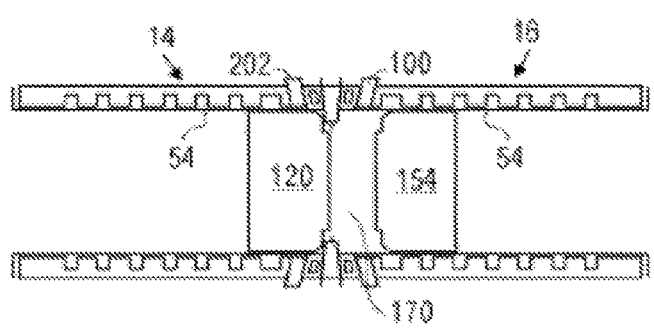

FIG. 8D shows the left and right pistons 120 and 154 at the end of exhaust. The internal volume 170 is again at its smallest size for full power operation. The sleeve valve 54 of the left valve arrangement 14 is moved to the right to close the exhaust port 202.

Figure 8E:
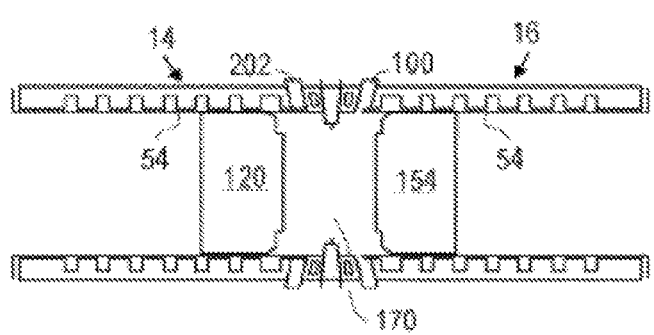
Figure 8F:
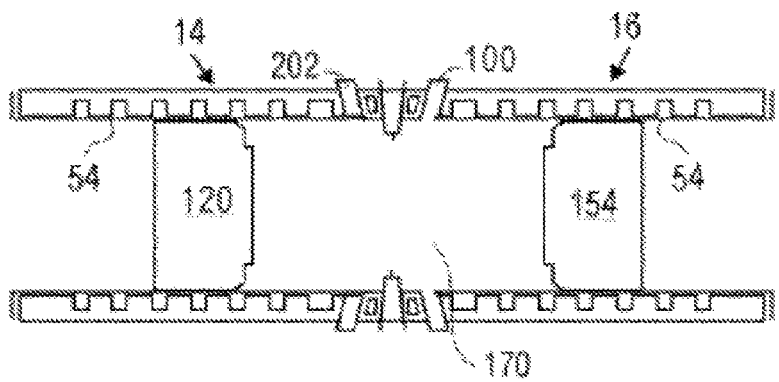

FIG. 8E illustrates the position of the left and right pistons 120 and 154 and the position of the sleeve valves 54 early in the intake stroke. The left piston 120 has moved to the left by a small distance, and the right piston 154 has moved to the right by a small distance. Referring to FIG. 6, the shape of the outer surface 196 of the cam 192 has moved the first follower 186 to the right by a small distance, and the side surface 198 of the first follower 186 has moved the second follower 188 down by a small distance. Referring to FIG. 2, downward movement of the second follower 188 of FIG. 6 has caused oil to flow into the oil pressure slot 68 on the left, and oil to flow out of the oil pressure slot 70 on the right. To compensate for a possible increase in pressure on the left surface 80 compared to a pressure on the right surface 82, the sleeve valve 54 has moved to the right by a small distance. The air inlet port 100 is now open by a small amount. Fuel is provided through a fuel opening (not shown) into the fuel supply cavity 96 and, referring to FIG. 3, the end surface 112 is moved to the right to open the fuel outlet port 108. The fuel is allowed to flow from the fuel supply cavity 96 through the fuel outlet port 108. Referring again to FIG. 8E, air and fuel enter into the internal volume 170. As shown in FIG. 8F, the left and right pistons 120 and 154 continue to move to the left and right, respectively. Referring to FIG. 6, the cam 184 is now in the illustrated position, wherein the first and second followers 186 and 188 have been displaced to their maximum. Referring again to FIG. 8F, the air inlet port 100 is now open to its maximum. The position illustrated in FIG. 8F corresponds to a peak 204 in FIG. 7.

Figure 8G:
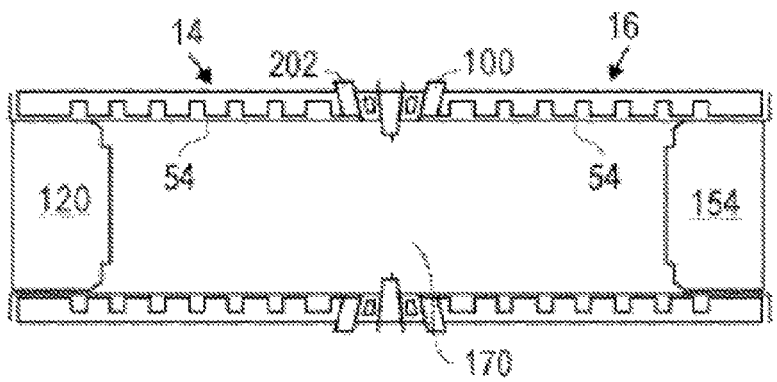

FIG. 8G illustrates the left and right pistons 120 and 154 at the end of intake. The pistons 120 and 154 have moved their maximum distances or strokes to the left and right, respectively. Referring to FIG. 6, the cam 192 has rotated so that the first follower 186 is again on a circular portion of the outer surface 196 and thus at its maximum position to the left for full-power operation. The second follower 188 is also at its uppermost position. Referring again to FIG. 8G, the sleeve valve 54 of the right valve arrangement 16 closes the air inlet port 100 and, referring to FIG. 3, closes the fuel outlet port 108.

The expansion stroke of FIG. 8B imparts angular momentum to flywheels connected to the left and right crankshafts 120 and 156 shown in FIG. 5. The momentum of the flywheels moves the left and right pistons 120 and 154 through the sequence illustrated in FIGS. 8C through 8G. The momentum then moves the left and right pistons 120 and 154 from their positions to the position illustrated in FIG. 8A, thereby reducing the size of the internal volume 170 and compressing the air within the internal volume 170.

Partial-power operation is now illustrated, primarily with reference to FIGS. 9A through 9G, and with the aid of the other figures heretofore described. With reference to FIG. 5, partial power operation is when the combustion chamber size-varying carriage 146 is rotated through the angle 172 counterclockwise to the left. Referring to FIG. 6, during partial-power operation, the valve-control carriage 180 is rotated through the angle 200 clockwise so that the components are in the position illustrated by the phantom lines.

Figure 9A:
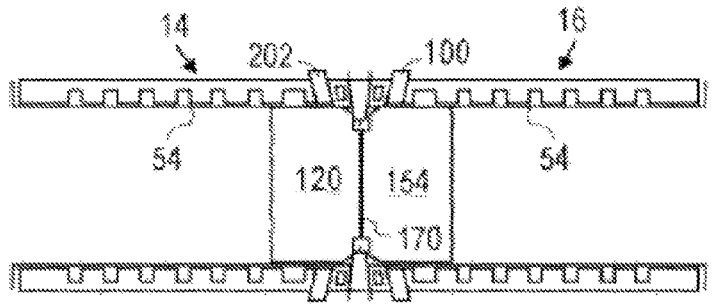
FIGS. 9A through 9G are cross-sectional side views illustrating partial-power operation of the engine.
Figure 9B:
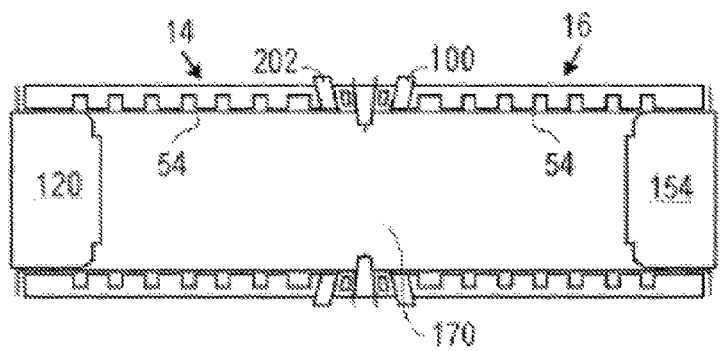
Figure 9C:
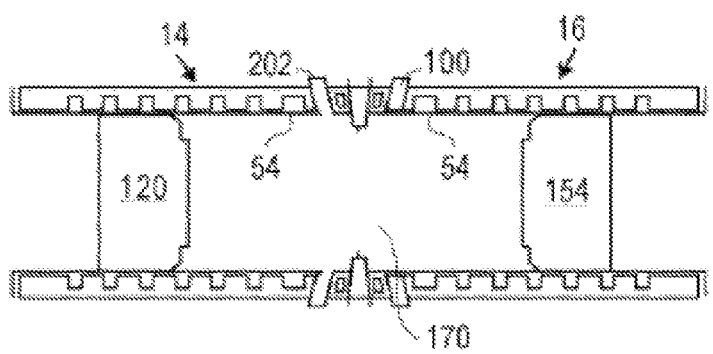
Figure 9D:
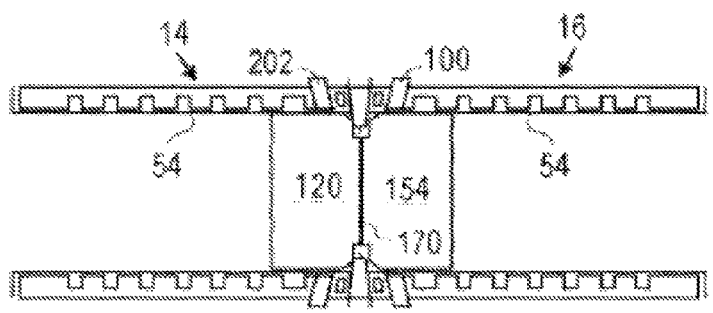

When comparing FIGS. 9A and 8A, it can be seen that the internal volume 170 during ignition is much smaller for partial power than for full power. When comparing FIGS. 9B and 8B, it will show that a maximum size of the internal volume is also smaller during partial-power operation than during full-power operation. FIGS. 9C and 9D show the positions of the left and right pistons 120 and 154 during exhaust and at the end of exhaust, respectively. The internal volume in FIG. 9D is smaller than the internal volume in FIG. 8D.

Figure 9E:
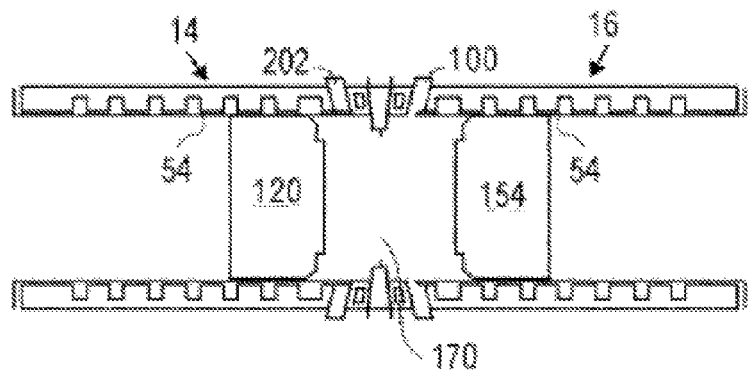

FIG. 9E illustrates the position of the left and right pistons 120 and 154 early during the intake stroke. The sleeve valve 54 of the right sleeve arrangement 16 has opened by a small amount. Referring to FIG. 6, the cam 192 has been rotated to deflect the first follower 186 by a maximum distance for partial-power operation, and to deflect the second follower 188 by a maximum distance for partial-power operation. Referring to FIG. 7, the distance that the sleeve valve 54 of the right sleeve arrangement 16 is displaced is reflected by comparing the height of the peak 204 to the height of the peak 206. It should also be noted that, although FIGS. 9E and 8E appear to be similar, there is in fact an advancement of the phase from the peak 204 to the peak 206, so that maximum opening of the air inlet port 100 only occurs in FIG. 8F during full-power operation, whereas maximum opening of the air inlet port 100 occurs in FIG. 9E during partial-power operation.

Figure 9F:
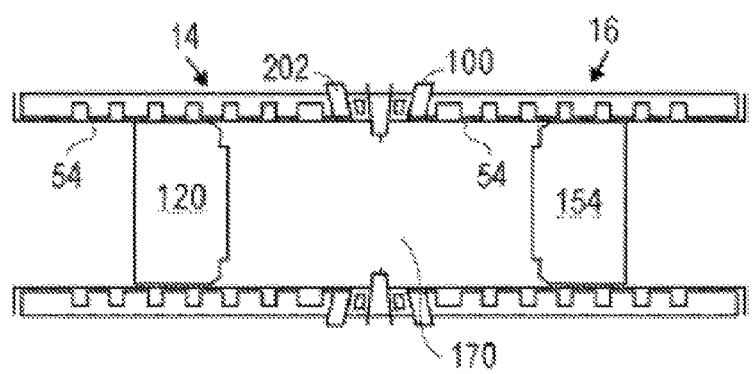
Figure 9G:
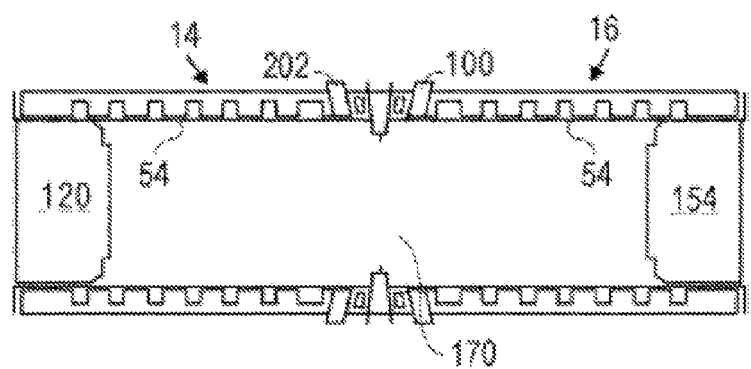

FIG. 9F illustrates the positioning of the left and right pistons 120 and 154 midway through intake. Referring to FIG. 6, the first follower 186 is not yet on the circular portion of the outer surface 196 of the cam 192, but the second follower 188 is still at its uppermost position. Referring again to FIG. 9F, the sleeve valve 54 of the right sleeve arrangement 16 closes the air inlet port 100, and referring to FIG. 3, the fuel outlet port 108 is also closed. Referring to FIG. 9G, the left and right pistons 120 and 154 continue to move to the left and to the right respectively, while the sleeve valves 54 are closed. Enlargement of the internal volume 170 causes a slight decrease in pressure. When the left and right pistons 120 and 154 begin to return toward one another, the pressure within the internal volume 170 again returns to the pressure of the internal volume 170 in FIG. 9F. The left and right pistons 120 and 154 then return to their position shown in FIG. 9A for purposes of ignition.

Referring to FIG. 2, heat that is generated in the combustion process is illustrated with reference to FIGS. 8A to 8G and 9A to 9G may cause overheating of the sleeve valve 54. An oil inlet port (not shown) through the cylinder block portion 36 is connected to the inlet groove 64 and a similar oil outlet port is connected to the outlet groove 66. A cooling fluid in the form of cooling oil is pumped through the oil inlet port and out of the oil outlet port. The cooling oil flows through the helical groove 62 over an outer surface of the sleeve portion 76. Heat convects from the sleeve portion 76 to the cooling oil, and is removed by the oil through the oil outlet port. Oil flow is from left to right, which ensures that the oil is as cool as possible closer to the left of the sleeve valve 54, although oil flow can be reversed to reduce pressure at the inlet groove 64 if it is found that oil leaks excessively past the left of the sleeve valve 54. Referring to FIG. 3, fuel circulating through the fuel supply cavity 96 cools the seat 74 that the end surface 112 comes into contact with.

One advantage of the invention is that energy losses are minimized in all modes. With reference to FIGS. 1, 2, and 5, it can be seen that the internal volume 170 is entirely defined by inner surfaces of the sleeve portions 76 of the left and right valve arrangements 14 and 16, an inner surface of the inner portion 92, and facing surfaces of the left and right pistons 120 and 154. A volume of the internal volume 170 is thus approximately the area of the left piston 120 multiplied by a distance between the facing surfaces of the left piston 120 and the right piston 154. It is also within the scope of the invention that the internal volume 170 be slightly larger than the surface area of the face of the left piston 120 multiplied by the distance between the facing surfaces of the left and right pistons 120 and 154, for example 20% larger, more preferably 10% larger when the left and right pistons 120 and 154 are at their maximum stroke. Because of the facing relationship of the left and right pistons 120 and 154, there is no cylinder head for the left piston 120 through which heat can escape, nor is there a cylinder head for the right piston 154 through which heat can escape. The facing relationship between the left and right pistons 120 and 154 thus assists in containment of heat energy, with a corresponding increase in efficiency.

What should also be noted is that the left and right pistons 120 and 154 have relatively small diameters compared to the volume of the internal volume 170. The relatively low surface area to volume ratio further assists in reducing heat losses. A reduction in surface area of a piston normally corresponds with an increase in the stroke of the piston in order to obtain the same displacement, but because left and right power delivery arrangements 22 and 24 are provided, the stroke of each piston 120 or 154 is approximately half of what would be required if only a single piston is provided. Because of the relatively short stroke length of, for example, the left piston 120, it can run at higher revolutions per minute and produce more power than in an arrangement where only a single piston is provided.

The extra heat that is contained with the facing relationship between the left and right pistons 120 and 154 can be extracted more efficiently in the partial-power operation of FIGS. 9A through 9G. In all low heat loss engines such as this, energy that is transferred through a piston to a drive train and energy losses in an exhaust of gas in an exhaust cycle together are more than 65%, more preferably more than 70% and more preferably more than 75% of the energy of the fuel.

What should be noted specifically with reference to FIGS. 9E through 9G is that the gas within the internal volume 170 expands to its maximum. As mentioned previously, expansion of the gas within the internal volume 170 causes cooling of the gas. Maximum expansion thus results in maximum cooling of the gas in the internal volume 170 and maximum extraction of heat from the gas. When the gas is exhausted, it is relatively cool compared to an arrangement having no variable compression and running at partial power. What should also be noted is that expansion and compression is asymmetric similar to the Atkinson Cycle or the Miller Cycle. A synergistic effect is created by the combination of low heat loss and asymmetric expansion.

Figure 10A:
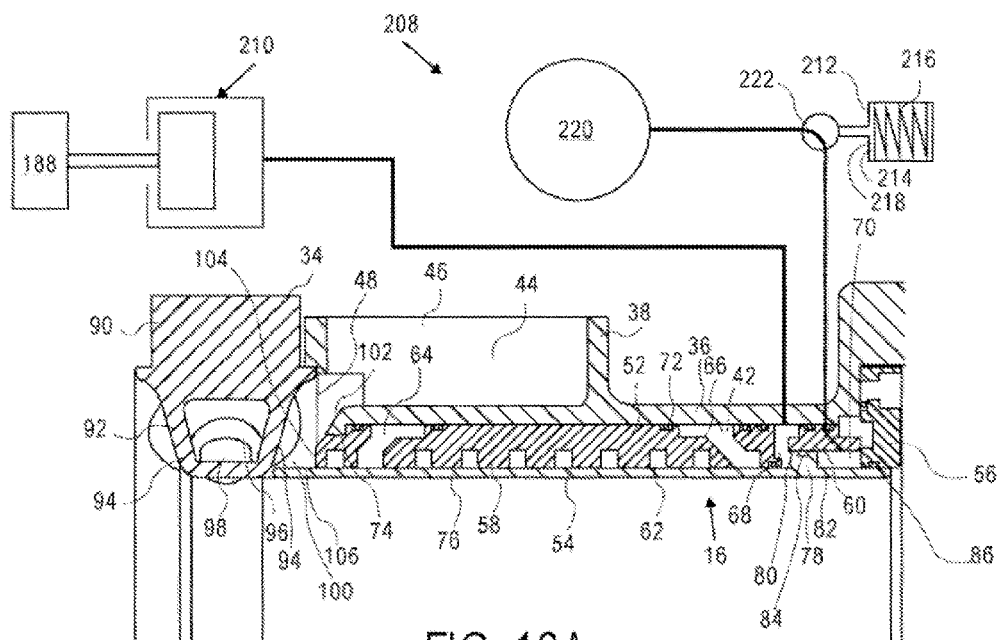
FIGS. 10A and 10B are schematic side views illustrating a hydraulic hold-closed system forming part of the engine.

FIG. 10A illustrates a hydraulic system 208 that is used to provide a varying amount of high pressure within the oil pressure slot 70 so that the sleeve valve 54 keeps the air inlet port 100 closed. As can further be seen in FIG. 10A, the second follower 188 of FIG. 6 is connected through a hydraulic connection system 210 to the oil pressure slot 68. The hydraulic connection system 210 ensures that translation of the second follower 188 causes corresponding translation of the sleeve valve 54.

The hydraulic system 208 includes a valve-pressure cylinder 212, a valve-pressure piston 214, and a valve return spring 216. The valve-pressure cylinder 212 and the valve-pressure piston 214 jointly form a valve-pressure reservoir 218 with the valve-pressure piston 214 forming a side piece of the valve-pressure reservoir 218. The valve return spring 216 is located outside the valve-pressure reservoir 218 against the valve-pressure piston 214.

The hydraulic system 208 further includes a high-pressure reservoir 220. The high-pressure reservoir 220 holds oil at a pressure higher than a pressure in the valve-pressure reservoir 218 when the valve is closed.

The high-pressure reservoir 220 and the valve-pressure reservoir 218 are connected through a rotating valve 222 to the oil pressure slot 70. In the position shown in FIG. 10A, the valve 222 connects the high-pressure reservoir 220 to the oil pressure slot 70, and tire valve-pressure reservoir 218 is disconnected from the oil pressure slot 70. In this state, the sleeve valve 54 is prevented from movement that would open the air inlet port 100, in particular due to piston friction.

Figure 10B:
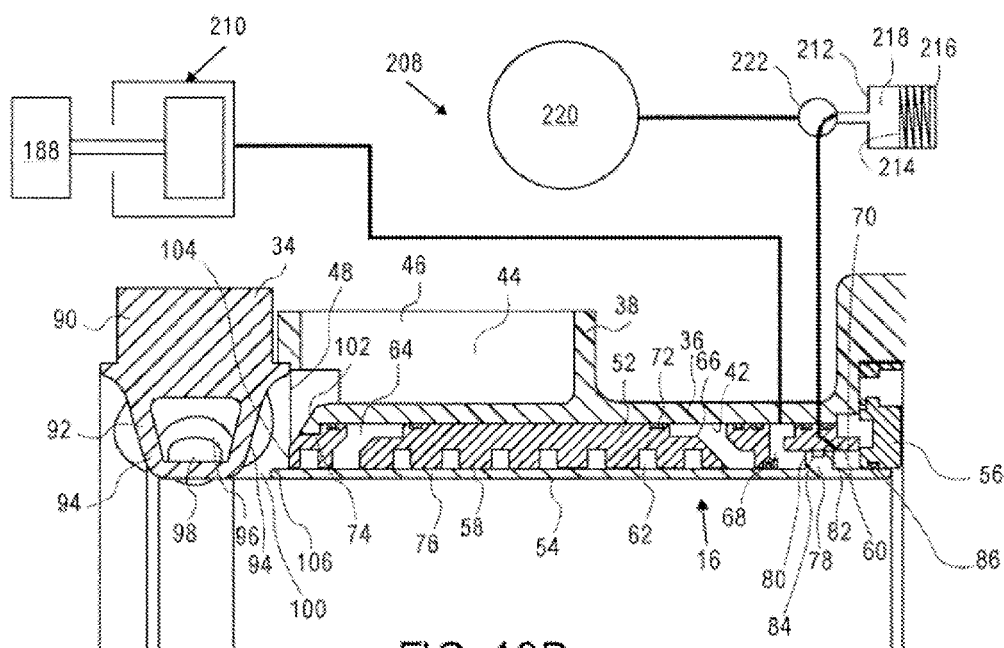

In FIG. 10B, the valve 222 is rotated so that it connects the valve-pressure reservoir 218 to the oil pressure slot 70, and disconnects the high-pressure reservoir 220 from the oil pressure slot 70. Due to the lower pressure in the valve-pressure reservoir 218 compared to the high-pressure reservoir 220, the sleeve valve 54 is permitted to open the air inlet port 100. The second follower 188, accordingly, moves into a position wherein the sleeve valve 54 opens the air inlet port 100. Movement of the sleeve valve 54 causes oil to flow out of the oil pressure slot 70 through the valve 222 into the valve-pressure reservoir 218 against a force created by the spring 216. Energy is stored in the spring 216. The energy stored in the spring 216 moves some of the oil back into the oil pressure slot 70. Flow of oil into the oil pressure slot 70 and out through the slot 68 creates a pressure differential between the surfaces 82 and 80, which causes the sleeve valve 54 to close the air inlet port 100. No work is done by the oil of the reservoir 220 when moving between the configurations in FIGS. 10A and 10B, because the valve 222 is only actuated to open to the high-pressure reservoir 220 when the sleeve valve 54 is closed, in that way, no oil needs to flow, yet the pressure is high.

Figure 11:
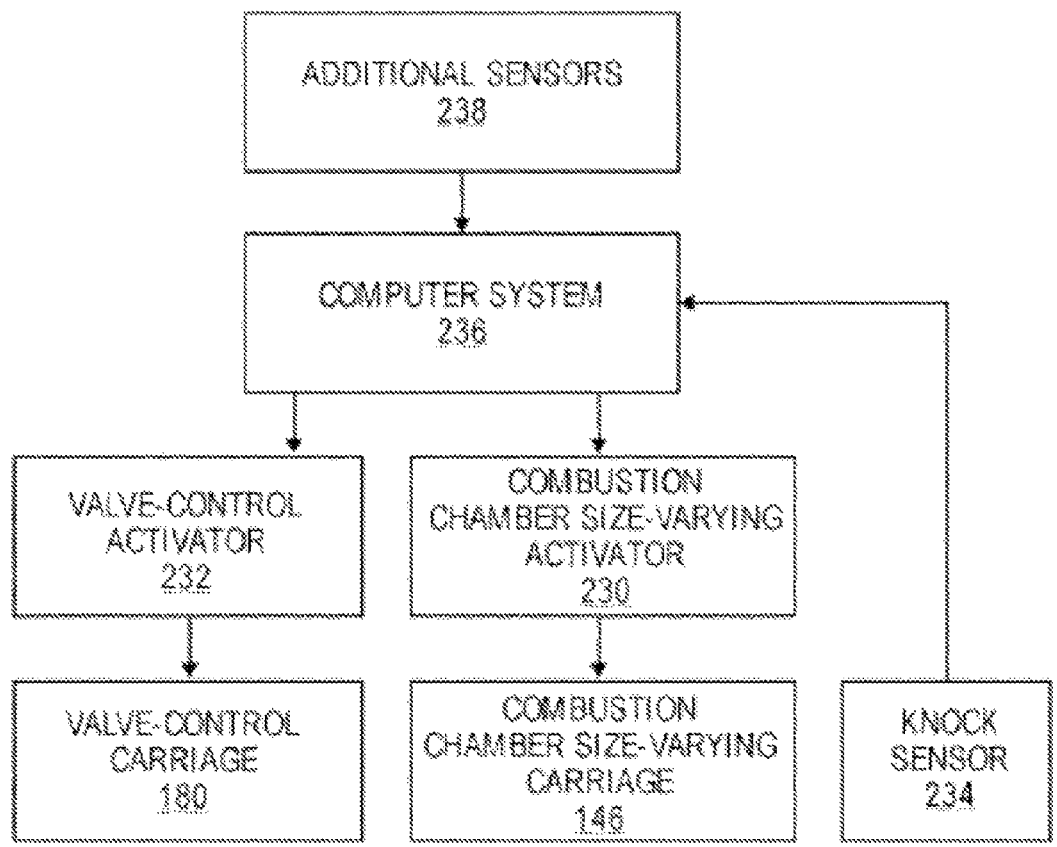
FIG. 11 is a block diagram of a control system forming part of tire engine.

FIG. 11 shows a control system forming part of the engine of FIG. 1, including the combustion chamber size-varying carriage 146, the valve-control carriage 180, a combustion chamber size-varying actuator 230, a valve-control actuator 232, a knock sensor 234, and a computer system 236.

The knock sensor 234 is connected to the body 12 shown in FIG. 1 and can detect pre-ignition due to over-compression. The computer system 236 is connected to the knock sensor 234 so that the knock sensor 234 provides a signal to the computer system 236 indicating pre-ignition or no pre-ignition.

The computer system 236 has a processor and memory. A set of instructions and a data map are stored in the memory. The set of instructions is executable by the processor so that the processor can provide a selected output. The set of instructions also interacts with the data file to vary a response from the computer system 236.

The combustion chamber size-varying actuator 230 and the valve-control actuator 232 are mounted to the combustion chamber size-varying carriage 146 and the valve-control carriage 180, respectively. The actuators 230 and 232 are connected to the computer system 236 and are under the control of the computer system 236. The computer system 286 controls the actuators 230 and 282 based on pre-ignition detected by the knock sensor 234. In particular, should pre-ignition be detected by the knock sensor 234, the computer system 236 adjusts the map. The computer system 236 utilizes the map to operate the combustion chamber size-varying actuator 230, so that the combustion chamber size-varying carriage 146 is moved to increase the minimum size of the volume within the engine forming the internal volume. An increase in the size of the internal volume results in a corresponding lowering of the compression ratio.

The combustion chamber size-varying carriage 146 thus serves the dual purpose of reducing the size of the volume forming the internal volume 170, as discussed with reference to FIGS. 9A to 9G, to reduce the compression ratio in the event of pre-ignition. The feature of varying the compression ratio based on pre-ignition is useful because it allows for different fuel types to be used. Should a switch, for example, be made from a high-octane fuel to a low-octane fuel, the knock sensor 234 would detect pre-ignition, and the compression ratio would be reduced by the combustion chamber size-varying carriage 146. The computer system 236 receives input from additional sensors 238, and bases its response also on the additional sensors 238. The additional sensors 238 may, for example, be sensors for detecting engine load, engine revolutions per minute, air temperature, water temperature, oil temperature, fuel temperature, altitude, etc. The system also allows for the use of alternate fuels such as methane, propane, ethanol, hydrogen, or other volatile flammable fuels.

One variation to the embodiments hereinbefore described is to have mechanical valve operation instead of the hydraulic valve operation described primarily with reference to FIG. 2. In a mechanical valve operating system, a fork can, for example, be connected directly to a sleeve valve, and the fork can be moved with a valve-control system such as the valve-control system 174 in FIG. 6.

In an alternative embodiment, it may also be possible to replace the hydraulic hold-closed system 208 of FIGS. 10A and 10B with a mechanical hold-closed system. In the mechanical hold-closed system, a spring can be located within the right casting 32, and act on a flange that is connected to a sleeve valve such as the sleeve valve 54.

Figure 12A:
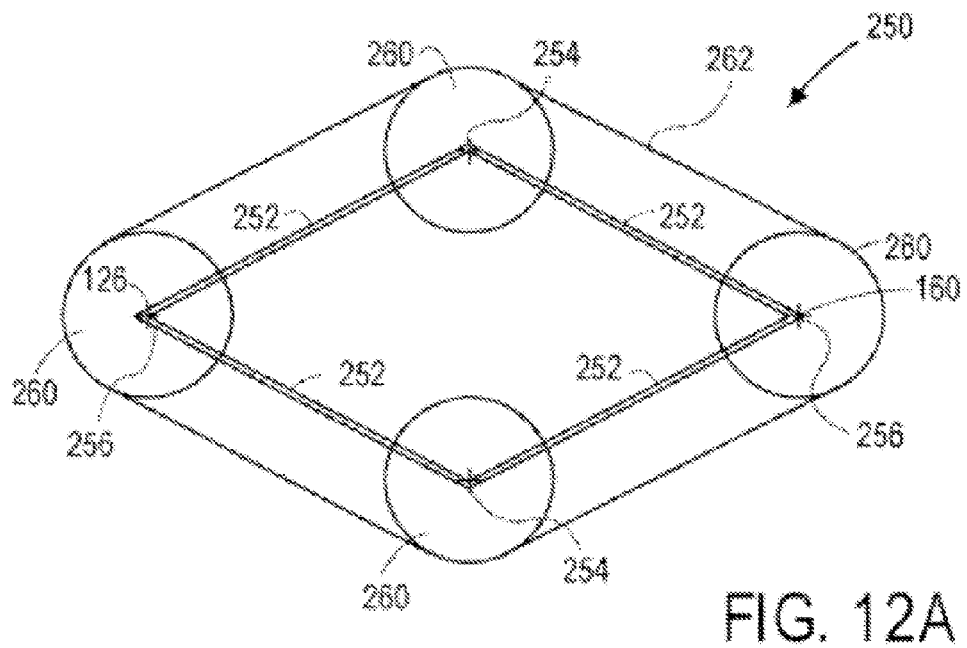
FIGS. 12A and 12B are side views of a combustion chamber size-varying carriage used in one alternative embodiment of an internal combustion engine of the invention.
Figure 12B:
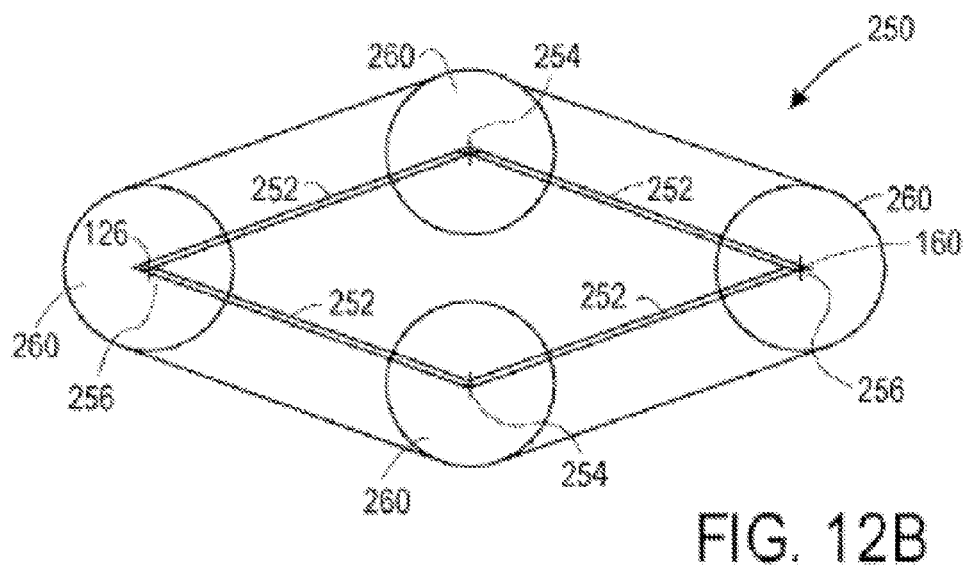

Chain and toothed belt drives have been developed that transfer power more efficiently than gear meshes such as between the gears 134, 136, 138 and 140 of FIG. 1. A challenge with the use of a closed loop elongate member such as a chain or a tooth belt is to keep it properly tensioned. FIGS. 12A and 12B illustrate components of a combustion chamber size-varying mechanism 250 that can be used instead of the combustion chamber size-varying mechanism 26 of FIG. 1. The two crank shafts 126 and 160 are connected to one another with four linkages connected to one another in the form of a parallelogram mechanism. The parallelogram mechanism formed by the linkages 252 has pivot points 254 at juxtaposed corners and pivot points 256 at juxtaposed corners. The pivot points 256 coincide with the bearing sections 126 and 160 of the crank shafts.

A respective idler roller or gear 260 is connected at a respective one of the pivot points 254 and 256. A flexible elongate member 262 formed into a closed loop runs sequentially from one of the idler rollers or gears 260 to the next. The flexible elongate member 262 may for example be a chain or a toothed belt. The idler rollers or gears 260 all have the same diameter, so that sections of the elongate member 262 extending from one of the idler rollers 260 to the next always has the same length as one of the links 252. A change of the parallelogram from the arrangement shown in FIG. 12A to the arrangement shown in FIG. 12B will cause a reduction in an arc that the elongate member 262 contacts one of the idler rollers 260 at one of the pivot points 254 and a corresponding increase in an arc that the elongate member 262 contacts one of the idler rollers 260 at one of the pivot points 256. The elongate member 262 thus always remains fully tensioned. Additionally and more importantly, the mechanism that is used for tensioning the elongate member 262 insures that the two crank shafts stay in the same relative phase as they are moved closer and farther apart.

In one example engine configuration, the minimum crank shaft spacing is 16 inches and the maximum spacing is 17 inches. Choosing the links 252 to be approximately 9 inches long, would cause the spacing of the idler rollers or gears 260 to be approximately 8 inches apart when the crank shafts are closest to one another and about 5.5 inches apart when the crank shafts are spaced 17 inches from one another.

Because the motion of the idler gears 260 is symmetric about a center line between the two crank shafts, both top and bottom sections of the elongate flexible member 262 are displaced the same amount, leaving the moving crank shaft and the fixed crank shaft at the same relative rotational angle. It is important to keep the links 252 the same length and the idler gears or rollers 260 the same diameter so that there is always the same amount of chain between each pair of idler gears or rollers 260.

It is likely that an additional idler roller or gear may be necessary to take up a very small amount of belt or chain tolerance in the elongate member 262 near the fixed crank shaft. This such an additional idler roller or gear would be used to account for manufacturing tolerances and wear in the elongate member 262. If tire elongate member 262 is a chain, or stretch in the elongate member 262 if the elongate member 262 is a belt.

Figure 13A:
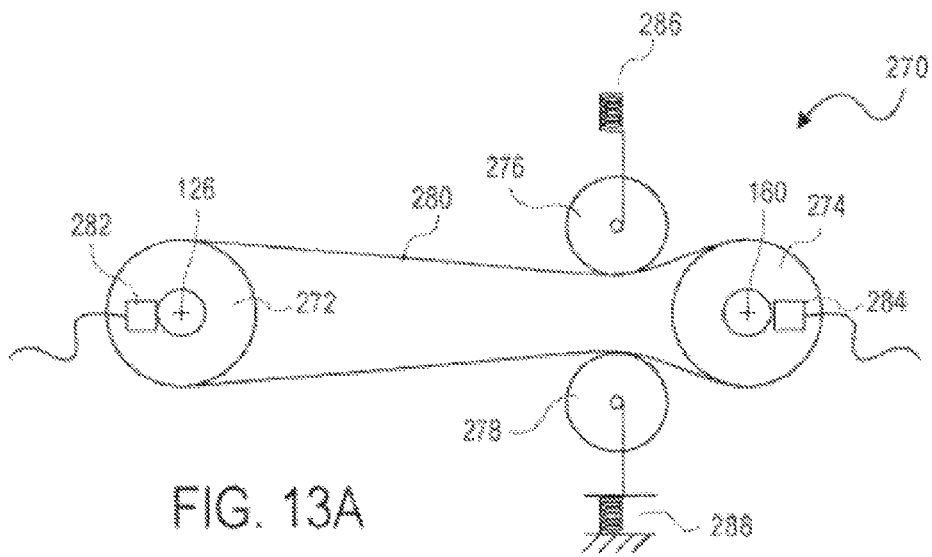
FIGS. 13A and 13B are side views of a combustion chamber size-varying carriage used in an further alternative embodiment of an internal combustion engine of the invention.
Figure 13B:
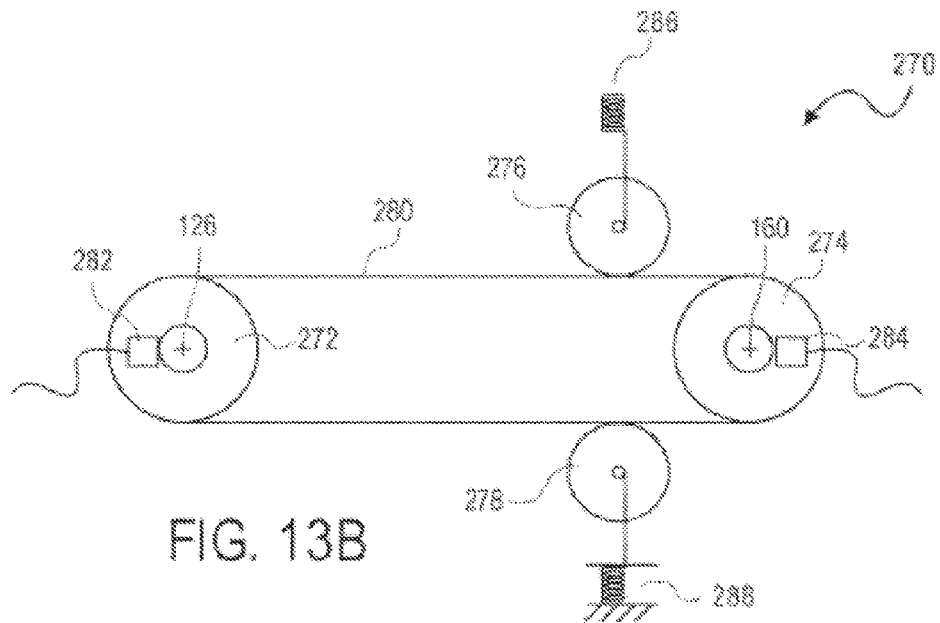

FIGS. 13A and 13B illustrate components of a combustion chamber size-varying mechanism 270 according to a further embodiment of the invention. The mechanism 270 includes four rollers or gears 272, 274, 276 and 278, and elongate member 280, and two sensors 282 and 284. The sensors 282 and a controller are used to keep the mechanism 270 simple. The elongate member 280 forms a closed loop over the rollers or gears 272 and 274. Bearing portions 126 and 160 can be adjusted relative to one another. The idler roller or gear 276 has an arbitrary size and is mounted on an actuator 286.

A position of the actuator 286 is controlled by a computer. The sensors 282 and 284 detect angles of the bearing sections 126 and 160 and provide the angles as feedback to the computer. The computer adjusts the actuator 286 based on a difference between the angles measured by the sensors 282 and 284.

As the bearing section 160 begins to get out of phase relative to the bearing section 126, during a change in compression ratio, the actuator 286 moves the idler roller or gear 276. Movement of the idler roller or gear 276 increases or decreases a length of the elongate member 280 on one side of the closed loop relative to the other side of the closed loop. Such adjustment of the elongate member 280 brings the bearing sections 126 and 160 to the desired phase angle relative to one another. The other side of the elongate member 280 is tensioned in a normal manner with the idler roller or gear 278 with either spring 288, air or hydraulic force supplied to keep the elongate member 280 tight.

The advantage of the systems of FIGS. 12A and B and 13A and B is that the crank shafts corresponding to the bearing sections 126 and 160 can be maintained exactly in phase to insure that the vibration level of the engine will remain minimal. When the crank shafts are in phase, the system is naturally balanced. An additional advantage of the mechanisms of FIGS. 12A and B and 13A and B is that they allow for more arbitrary motion of the movement of the crank shafts. This added flexibility of the crank shaft motion control allows for much more simple mechanisms and for much more rigid structures to hold them.

In the arrangement of FIG. 2, an O-ring 300 is located within an inner groove at an end of the oil path-defining piece 52. The O-ring 300 has an outer, front and rear surfaces that seal with groove. An inner surface of the O-ring 300 is located against an outer surface of the sleeve portion 76. The sleeve portion 76 can slide relative to the O-ring 300. The O-ring 300 prevents oil within the inlet groove 64 from passing over the outer surface of the sleeve portion 76 into the air inlet port 100. Over time it may happen that the O-ring 300 begins to wear, in which case oil will enter through the air inlet port 100 into the combustion chamber, which can lead to excessive smoking of the engine.

FIG. 14 illustrates an arrangement that is similar to the arrangement of FIG. 2, except that the O-ring 300 and the oil inlet port of the arrangement of FIG. 2 are not provided in the arrangement of FIG. 14. Instead, a flexible bellows seal 302 is provided. The seal 302 has front and rear ends 304 and 306. The front end 304 is mounted to an end of the sleeve portion 76 and moves together with the sleeve portion 76 in a reciprocating manner. The rear end 306 is mounted to the casing 32 and remains stationary together with the casing 32 upon movement of the sleeve portion 76. Because of the alternating bellows shape of the seal 302 between the front and rear portions 304 and 306, the seal 302 is sufficiently flexible to allow for relative movement of the front end 304 relative to the rear end 306. The seal 302 may also have a spring constant that assists in closing the sleeve portion 76.

An inner surface of the seal 302 together with the end surface 102 define an oil outlet port 308. Oil flowing over an outer surface of the sleeve portion 76 enters the oil outlet port 308. The oil is subsequently cooled and recirculated into an oil inlet port 310. This seal 302 thus prevents the oil from entering into the combustion chamber.

An outer surface of the seal 302 together with the side surface 94 define an air inlet port 100. The seal 802 thus does not prevent air from flowing through the air inlet port 100 into the combustion chamber.

What should further be noted is that a lip 312 is provided at an end of the sleeve portion 76. The lip 312 has a tapered inner surface on a side facing the piston 154 and thus on a side opposite to the central connecting piece 34. When the piston 154 compresses air within the combustion chamber, with the sleeve portion 76 in a closed position, a positive pressure differential is created between inner and outer surfaces of the lip 312. The positive pressure differential further assists in keeping the lip 312 closed against the central connecting piece 34. The piston 154 has a front surface 320 with a tapered edge 322. The tapered edge 322 has a shape that is complementary to a shape of the inner surface of the lip 312 so that the lip 312 does not inhibit movement of the piston 154.

Although a bellows type seal 302 is described, it should be understood that another type of flexible seal may be used instead of a bellows type seal. A cone type spring arrangement can, for example, be used as a seal or two or more of such cone type seal arrangements can be stacked onto one another in back-to-back fashion. It may also be possible to form a diaphragm out of steel or another metal that can tolerate the thermal stresses of the engine.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art. Some of the technologies described may, for example, find application in rotary engines, engines having only a single crankshaft, engines having poppet valves, engines having electrically controlled valve actuation, engines having external mixing of fuel and air, engines having more than one piston connected to one crankshaft, etc.

What is claimed is:

1. An internal combustion engine, comprising:
   a body comprising a cylinder block;
   a piston disposed in a cylinder formed within the cylinder block;
   a port in the body to allow air and fuel into an internal volume within the cylinder;
   a drive shaft having a bearing section mounted for rotation on a respective drive shaft axis through the body and having an offset throw section, the piston and offset throw section of the drive shaft being connected such that reciprocating movement of the piston increases and decreases a size of the internal volume between minimum and maximum sizes; and
   a sleeve valve positioned in the cylinder and at least partially encircling the piston, the sleeve valve comprising a sleeve portion and a lip disposed at an end surface, the lip comprising an inner surface directed inward toward the internal volume and an outer surface directed away from the internal volume, the sleeve valve being movable in an axial direction between a first position where the port is open and a second position where the sleeve valve closes the port, the sleeve valve closing the port in the second position by at least part of the outer surface of the lip contacting a valve seat, the inner surface experiencing a positive pressure differential relative to the outer surface of the lip when gases within the internal volume are compressed by movement of the piston, the positive pressure differential applying an additional force in the axial direction toward the second position that assists in closing the port.

2. The internal combustion engine as recited in claim 1, wherein a distal end of the lip extends beyond the sleeve portion of the sleeve valve into the internal volume.

3. The internal combustion engine as recited in claim 1, wherein the inner surface of the lip forms an angle other than zero degrees with respect to the sleeve portion of the sleeve valve.

4. The internal combustion engine as recited in claim 3, wherein the piston includes a front surface having a tapered edge.

5. The internal combustion engine as recited in claim 4, wherein the angle of the inner surface of the sleeve valve lip is complimentary to the tapered edge of the piston.

6. The internal combustion engine as recited in claim 1, further including:
an oil path-defining piece adjacent to the sleeve valve, surfaces of the oil path-defining piece and the sleeve valve defining an oil passage;
an oil inlet port through the body into the oil passage; and
an oil outlet port from the oil passage through the body.

7. The internal combustion engine as recited in claim 6, further including: a bellows seal having a first end affixed to the body and a second end affixed to the sleeve valve.

8. The internal combustion engine as recited in claim 7, wherein the second end of the bellows seal is affixed proximate the end surface of the sleeve valve.

9. The internal combustion engine as recited in claim 1, wherein the lip is affixed to the end surface of the sleeve valve.

10. The internal combustion engine as recited in claim 1, wherein a distal end of the lip extends beyond the sleeve portion of the sleeve valve into the internal volume.

11. The internal combustion engine as recited in claim 1, wherein the inner surface of the lip forms an angle other than zero degrees with respect to the sleeve portion of the sleeve valve.

12. An internal combustion engine, comprising:
a body defining first and second cylinders in communication with each other;
a first piston in a first cylinder formed within the body and a second piston in a second cylinder formed within the body, the first cylinder and the second cylinder being disposed in an opposed arrangement such that an internal volume within the first cylinder and the second cylinder increases as the first and second pistons move away from each other and decreases as the first and second pistons move toward each other;
a first port in the body to allow air and fuel into the internal volume;
a second port in the body to allow exhaust gas out of the internal volume;
a first sleeve valve positioned in the first cylinder and at least partially encircling the first piston, the first sleeve valve comprising a sleeve portion and a lip disposed at an end surface, the lip comprising an inner surface directed inward toward the internal volume and an outer surface directed away from the internal volume, the first sleeve valve being movable in an axial direction between a first position where the first port is open and a second position where the first sleeve valve closes the first port, the inner surface experiencing a positive pressure differential relative to the outer surface of the lip when gases within the internal volume are compressed by movement of the cylinder, the positive pressure differential applying an additional force in the axial direction toward the second position that assists in closing the first port; and
a second sleeve valve positioned in the second cylinder and at least partially encircling the second piston, the second sleeve valve being movable in the axial direction between a first position where the second port is open and a second position where the second sleeve valve closes the second port.

13. The internal combustion engine as recited in claim 12, wherein the lip extends into the first cylinder beyond the sleeve portion of the first sleeve valve.

14. The internal combustion engine as recited in claim 12, wherein the lip is affixed to the end surface of the first sleeve valve.

15. The internal combustion engine as recited in claim 12, wherein the lip and the end surface of the first sleeve valve comprises a unitary structure.

16. The internal combustion engine as recited in claim 12, wherein the inner surface of the lip forms an angle other than zero degrees with respect to the sleeve portion of the first sleeve valve.

17. In an internal combustion engine comprising a body, a piston moving within a cylinder formed within the body, and a port in the body to allow air and fuel into an internal volume within the cylinder, a sleeve valve positioned within the cylinder, the sleeve valve comprising:
a sleeve body having a sleeve portion and an end surface, the sleeve body being slidably movable in an axial direction within the cylinder between a first position where the port is open and a second position where the sleeve valve closes the port; and
a lip extending from the end surface and comprising an inner surface directed inward toward the internal volume and an outer surface directed away from the internal volume, the inner surface experiencing a positive pressure differential relative to the outer surface of the lip when gases within the internal volume are compressed by movement of the piston, the positive pressure differential applying an additional force in the axial direction toward the second position that assists in closing the port.

18. The sleeve valve as recited in claim 17, wherein the lip is affixed to the end surface.

19. The sleeve valve as recited in claim 17, wherein the lip and the end surface are a unitary structure.

20. The sleeve valve as recited in claim 17, wherein the inner surface of the lip forms an angle other than zero degrees with respect to the sleeve portion of the sleeve valve.

21. The sleeve valve as recited in claim 20, wherein the lip has a distal end that extends into the internal volume of the cylinder beyond the sleeve portion of the sleeve valve.

22. The sleeve valve as recited in claim 21, wherein the piston has a front surface with a tapered edge, the inner surface of the lip is complementary to the tapered edge of the piston.

23. A method comprising:
reciprocally moving a piston disposed in a cylinder formed within an engine body such that an internal volume within the cylinder increases and decreases between minimum and maximum sizes;

admitting fuel and air into the internal volume via a port in the engine body; and moving a sleeve valve positioned in the cylinder and at least partially encircling the piston in an axial direction between a first position where the port is open and a second position where the sleeve valve closes the port, the sleeve valve comprising a sleeve portion and a lip disposed at an end surface, the lip comprising an inner surface directed inward toward the internal volume and an outer surface directed away from the internal volume, the inner surface experiencing a positive pressure differential relative to the outer surface of the lip when gases within the internal volume are compressed by movement of the piston, the positive pressure differential applying an additional force in the axial direction toward the second position that assists in closing the port.

24. The method recited in claim 23, wherein reciprocally moving the piston comprises rotating a drive shaft comprising a bearing section and mounted for rotation on a respective drive shaft axis through the body and having an offset throw section, the piston and offset throw section of the drive shaft being connected.

* * * * *